US009959717B2

(12) United States Patent
Thornton et al.

(10) Patent No.: US 9,959,717 B2
(45) Date of Patent: May 1, 2018

(54) SECURITY AND FIRST-RESPONDER EMERGENCY LIGHTING SYSTEM

(71) Applicant: Networked Emergency Systems Inc., Colorado Springs, CO (US)

(72) Inventors: Barry Thornton, Austin, TX (US); Mark Cohen, Costa Mesa, CA (US)

(73) Assignee: Networked Emergency Systems Inc., Colorado Springs, CO (US)

( * ) Notice: Subject to any disclaimer, the term of this patent is extended or adjusted under 35 U.S.C. 154(b) by 562 days.

(21) Appl. No.: 14/281,851

(22) Filed: May 19, 2014

(65) Prior Publication Data

US 2014/0340222 A1 Nov. 20, 2014

Related U.S. Application Data

(60) Provisional application No. 61/855,534, filed on May 17, 2013.

(51) Int. Cl.
*G08B 1/08* (2006.01)
*G08B 7/06* (2006.01)
*H05B 37/02* (2006.01)

(52) U.S. Cl.
CPC ............ *G08B 7/062* (2013.01); *G08B 7/066* (2013.01); *H05B 37/0272* (2013.01); *Y02B 20/445* (2013.01)

(58) Field of Classification Search
None
See application file for complete search history.

(56) References Cited

U.S. PATENT DOCUMENTS

| 8,994,540 | B2 * | 3/2015 | Fadell | H04L 12/6418 |
| | | | | 340/628 |
| 9,208,676 | B2 * | 12/2015 | Fadell | G05B 19/042 |
| 2002/0005826 | A1 | 1/2002 | Pederson | |
| 2008/0258880 | A1 | 10/2008 | Smith et al. | |
| 2010/0232317 | A1 | 9/2010 | Jing et al. | |
| 2010/0324962 | A1 * | 12/2010 | Nesler | G01R 21/133 |
| | | | | 705/7.36 |
| 2011/0110531 | A1 | 5/2011 | Klefenz et al. | |
| 2014/0346972 | A1 * | 11/2014 | Tran | H05B 37/0272 |
| | | | | 315/307 |
| 2016/0249395 | A1 * | 8/2016 | Logue | G08B 25/10 |
| 2016/0286629 | A1 * | 9/2016 | Chen | H05B 37/0272 |

OTHER PUBLICATIONS

International Search Report and Written Opinion for PCT Appl. No. PCT/US14/38673 dated Nov. 12, 2014 (13 pages).

* cited by examiner

*Primary Examiner* — Julie Lieu
(74) *Attorney, Agent, or Firm* — Andrews Kurth Kenyon LLP; Dragan Plavsic

(57) ABSTRACT

A network system in a building complex linking different locations together and facilitating information and data exchange and access, includes 'N' number of autonomous nodes for receiving, processing, and storing sensory data collected by one or more sensors relating to an environment in 'N' number of regions within the building complex. The nodes are configured to communicate and share sensory data among the 'N' number of nodes and to generate a dynamic virtual map of the building complex environment that is accessible by users having access to the network.

47 Claims, 14 Drawing Sheets

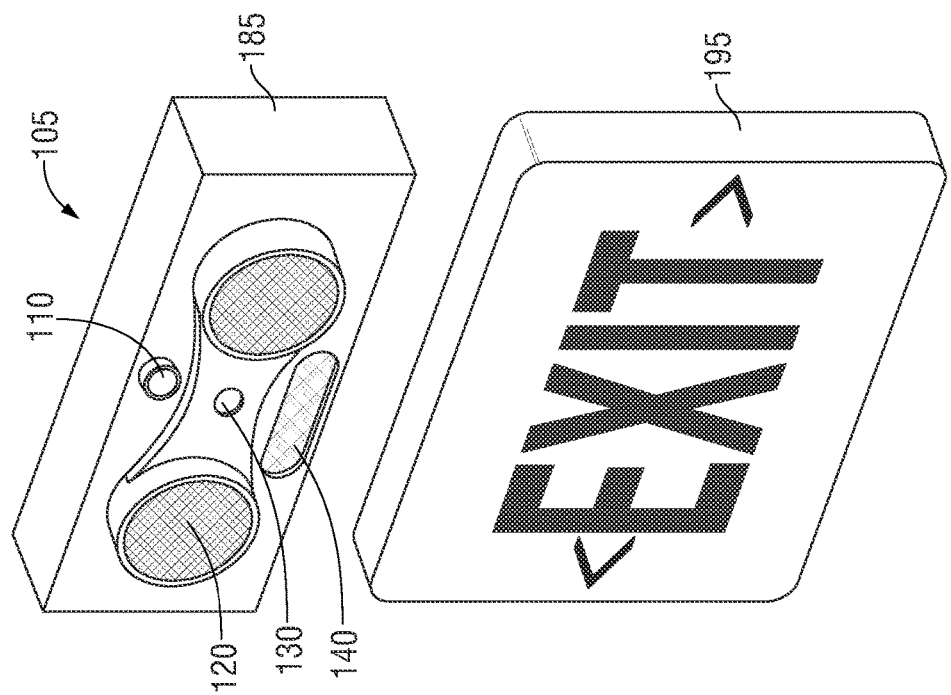
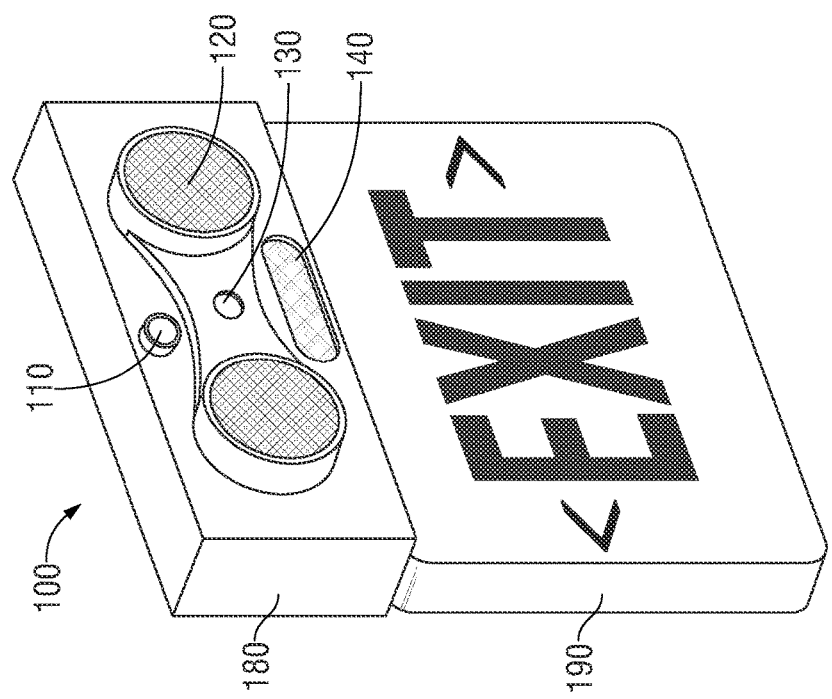

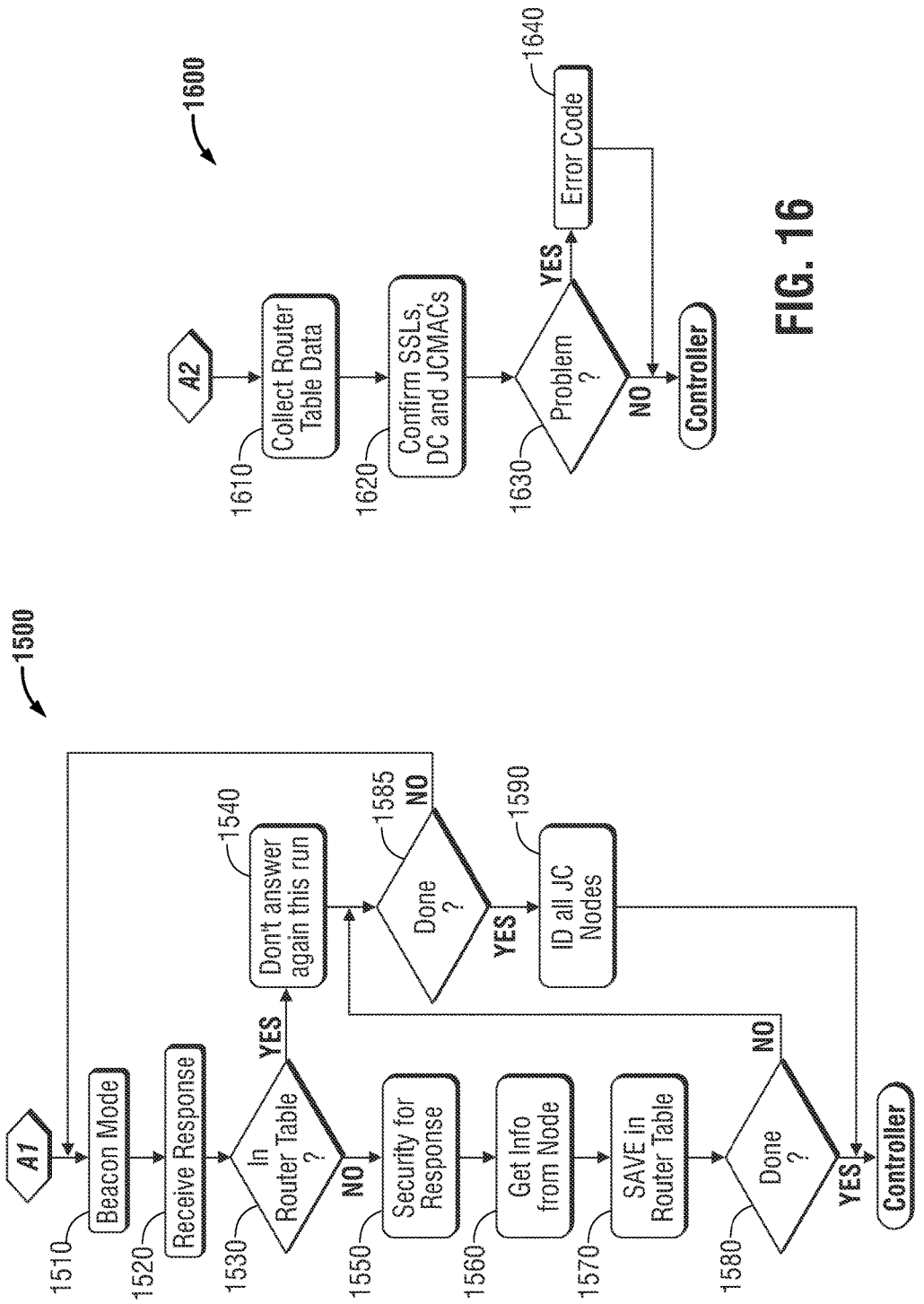

| Code | Area | Function | Quantity |
|---|---|---|---|
| 1 | Power | Mains | Level |
| 2 | | Battery | Level |
| 3 | | | Level after test 5-Sec |
| 4 | | | Level after test 60-Sec |
| 5 | | | Level after test 90-min |
| 6 | | | Level after test 1-Sec |
| 7 | Lighting | | Current when ON |
| 8 | | | Light Level when ON |
| 9 | Sensor | Temp | Level Now |
| 10 | | IR | Level Now |
| 11 | | Smoke | Level Now |
| 12 | | CO2 | Level Now |
| 13 | | CO | Level Now |
| 14 | | NOX | Level Now |
| 15 | | Gas | Level Now |
| 16 | | Accel | Level Now |
| 17 | | Audio | Level Now |
| 18 | Network | | Lost NODE |
| 19 | | | Losy Link |
| 20 | | | Lost Link Level |

FIG. 19

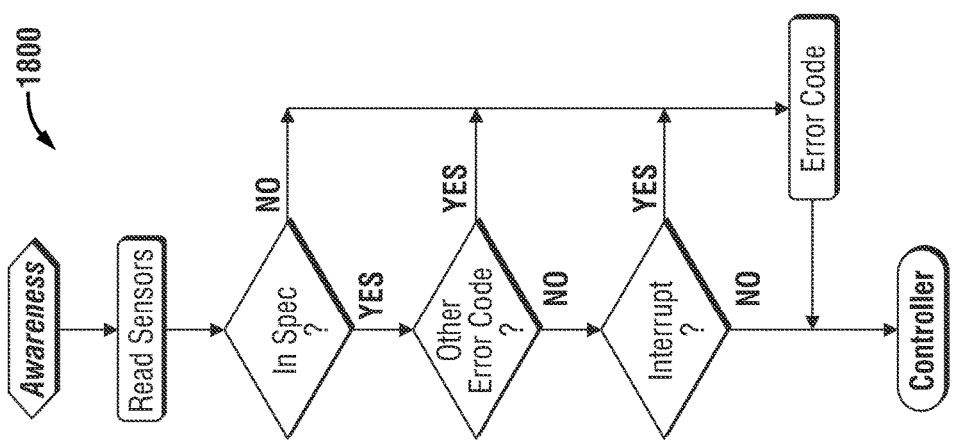

FIG. 18

SECURITY AND FIRST-RESPONDER EMERGENCY LIGHTING SYSTEM

CROSS-REFERENCE TO RELATED APPLICATIONS

This application claims priority under 35 U.S.C. § 119(e) to U.S. Provisional Application No. 61/855,534 filed May 17, 2013, which is incorporated herein by reference in its entirety.

FIELD

Embodiments disclosed herein relate generally to emergency and security service infrastructure in buildings and building complexes.

BACKGROUND AND SUMMARY

Buildings and building complexes sometimes present a hostile environment within to occupants and first responders in times of emergency. For example, several problems often confront first responders, such as assessing the real environmental conditions in areas not directly accessible, communicating with occupants of the building that may be trapped in the environment and instructing them on how to gain safety after a safe exit path has been determined, and gaining access to building plans and layouts to provide the information on unfamiliar geographies for the basis of intelligent decision making on the spot, among others. There is a need for a system that overcomes the problems mentioned.

BRIEF DESCRIPTION OF THE DRAWINGS

The invention is illustrated in the accompanying drawings wherein,

FIGS. 1A and 1B illustrate different embodiments of a node unit for use in an exemplary building network emergency system.

FIG. 15 illustrates elements of an exemplary method of building a Router Table for use in an embodiment of an exemplary building network emergency system.

FIG. 16 illustrates elements of an exemplary method of evaluating an exemplary building network emergency system.

FIG. 18 illustrates elements of an exemplary method of taking sensor readings in an exemplary building network emergency system.

FIG. 19 illustrates an exemplary error message format in an in an exemplary building network emergency system.

SUMMARY

Figure 2:
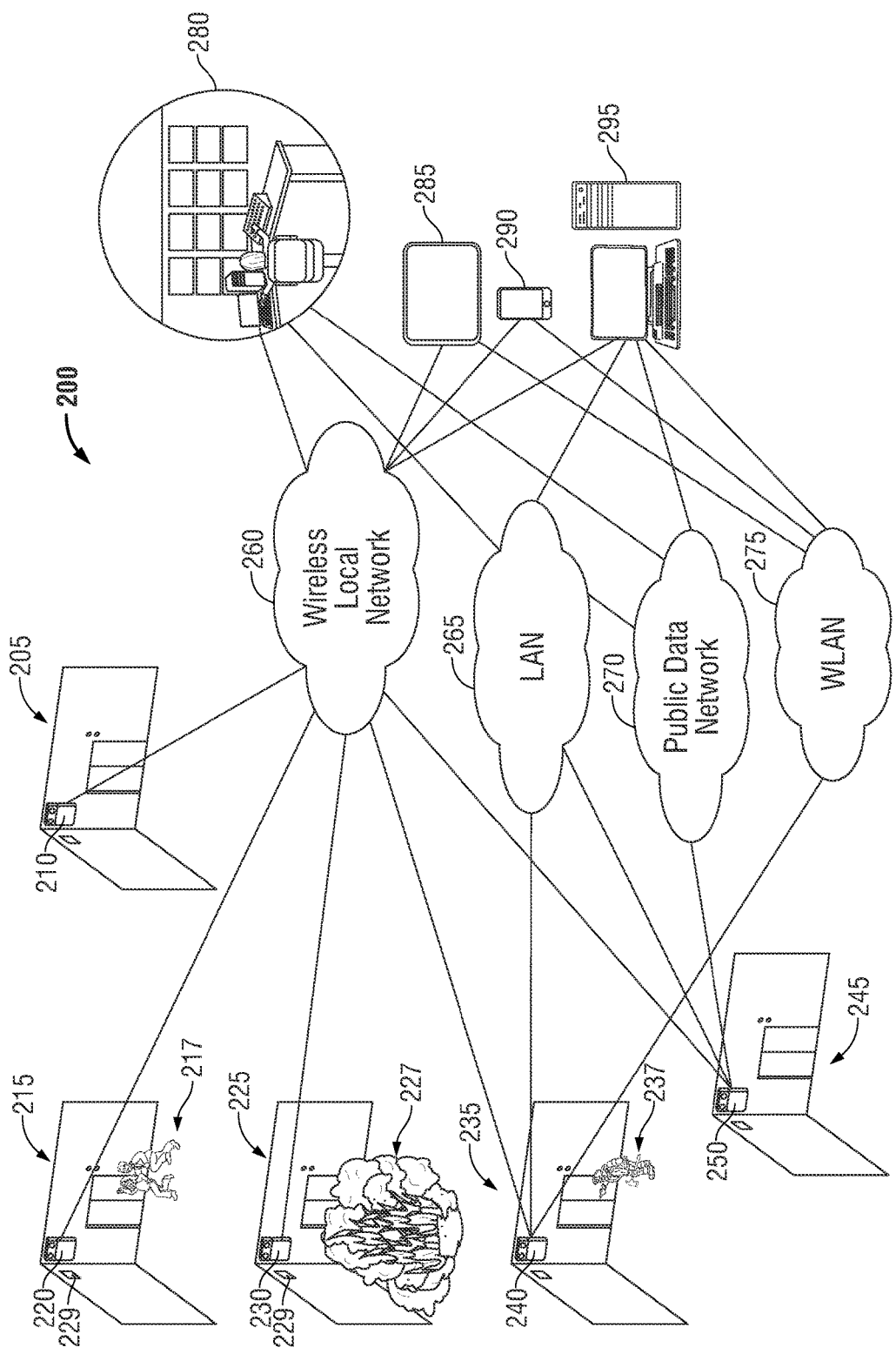
FIG. 2 depicts an exemplary building network emergency system.

In one aspect, embodiments disclosed herein relate to a node for use in a building network emergency system including a plurality of sensors, the plurality of sensors configured to collect a plurality of types of building environment data, an emergency light system having illumination lighting and alert lighting, an audio loudspeaker, one or more media inputs, one or more media outputs, a wireless local network transceiver adapted and configured for communicating with one or more other nodes of the building network emergency system. The node includes a computer operatively coupled to the plurality of sensors, the emergency light system, the audio loudspeaker, the one or more media inputs, the one or media outputs, and the wireless local network transceiver, the computer including a processor operatively coupled to a memory. The memory comprises instructions which when performed by the processor cause the node to store building data in the memory as local building data. Building data includes at least one of building environment data collected by the plurality of sensors and media input data acquired by the one or more media inputs. The instructions cause the node to transmit the local building data and local node identification data to at least one neighbor node via the wireless local network transceiver, the neighbor node being one of one or more other nodes of the building network emergency system, and to receive and store in the memory remote building data and node identification data from the neighbor node via the wireless local network transceiver, wherein the remote building data comprises local building data of another node of the building network emergency system.

In other aspects, embodiments disclosed herein relate to a network system in a building complex linking different locations together and facilitating information and data exchange and access, including 'N' number of autonomous nodes for receiving, processing, and storing sensory data collected by one or more sensors relating to an environment in 'N' number of regions within the building complex. Each of the nodes include a processor and memory for receiving, transmitting, and storing the data related to the building complex environment, and one or more radio transceiver modules for transmitting and receiving data signals with other network nodes, wherein the nodes are configured to communicate and share sensory data among the 'N' number of nodes and to generate a dynamic virtual map of the building complex environment that is accessible by users having access to the network.

In yet other aspects, embodiments disclosed herein relate to a method of monitoring an internal building environment, including providing a network of 'N' number of autonomous nodes for receiving, processing, and storing sensory data collected by one or more sensors relating to an environment in 'N' number of regions within the building, collecting and processing, using a processor and memory, sensory data at each of an 'N' number of nodes throughout the building, transmitting and receiving, using processors and memory of the nodes, collected sensory data among each of the 'N' number of nodes, and storing the sensory data and generating a dynamic virtual map of the building environment.

In still other aspects, embodiments disclosed herein relate to an emergency lighting unit including a lighting system to illuminate a local area, a lighting system to attract the human eye to its location, a battery power supply connected to charger from the building mains power, a detector-activator to activate the unit when the mains power fails, a computer functioning as a network router, server and file management system coupled to the radio transceiver module(s), a non-volatile memory system coupled to the computer for data of media storage, and an array of sensors.

DETAILED DESCRIPTION

Embodiments of a building network emergency system (BNES) are disclosed. The BNES may be configured as a single system comprised of specialized sub-systems, the interconnection of those sub-systems under software control, battery power and associated management software and control and interfacing to provide various performance features described herein. The subsystems, also called nodes, may be distributed throughout a building, facility, compound, campus, site, or other location including multiple buildings (a "building complex"), creating a wireless local network, including, in embodiments, a private and public ad-hoc Wi-Fi IEEE 802.11-based network. The network may connect various multiple nodes via wireless links, such as Wi-Fi radio, to other individual nodes. The network may be private and/or password protected and may transfer information around various parts of the network. The network may be configured to link locations in a building complex together thereby facilitating information and data exchange and access to various locations in the building or facility. For example, the BNES may be used in emergency situations such as fire, earthquake, or other natural or man-made problems. In response to an emergency situation, a wireless IEEE 802.11-based Wi-Fi network may be configured to provide first-responders' smart phones or tablet computers with live data including video, audio, and data from sensors relating to the environment within the building. The linkage may also provide communications to those locations thus equipped, along with a local source of information including maps, diagrams, directions, manuals, and illustrations from which responders may work. In other embodiments, the BNES may be used for monitoring the building or facility for purposes of security, administration, and control.

FIGS. 1A and 1B illustrate different embodiments (100, 105) of a node unit (or node) for use in an exemplary building network emergency system. Each node 100, 105 includes illumination lighting 120, camera 110, microphone 130, loudspeaker 140, and alert lighting 190, 195 in the form of an illuminated EXIT sign. Not depicted but included in nodes 100, 105 are building environment sensors and a wireless local network transceiver and antenna. In node 105, alert lighting 195 is housed separately from node control unit 185, which contains the sensors and control hardware. In an exemplary embodiment of node 105, alert lighting 195 is connected to node control unit 185 via a 3-wire hard-wired connection (not-shown) and the two may be separated by a distance of, for example, 6"-72". In node 100 alert lighting 195 is integrated with node control unit 180. In an embodiment, alert lighting 195 is coupled to node control unit 185 via plastic tracks and small metal fingers (not depicted). Other alternative embodiments include embodiments in which all components are contained in a single housing, or in which illumination lighting 120 is not contained in the same housing as sensors or control hardware. Exemplary node 900 in FIG. 9 depicts an embodiment in which illumination lighting 910 is not contained in the same housing as the control hardware.

FIG. 2 depicts an exemplary building network emergency system 200 in an exemplary building complex with exit locations 215, 225, 235, 245, and 205. In the exemplary building complex shown in FIG. 2, exit locations 235, 225, and 215 are located on a common stairwell in the same corner of the same building on the first, second and third floors of the building, location 205 is a different corner on the same floor of the same building as location 215, and location 245 is in a different building in the same building complex. Nodes 210, 220, 230, 240, and 250 are located in exit door locations 205, 215, 225, 235, and 245, respectively. Each node 210, 220, 230, 240, and 250 is linked to wireless local network 260, which may be a wireless local area network operating under an IEEE 802.11-based network protocol and may be a private and/or a public network. Some nodes are connected to other networks. Nodes 240 and 250 are connected to local area network (LAN) 265, which may be, for example, a wired Ethernet network or Wide Area Network (WAN); node 240 is connected to a WLAN (wireless local area network) 275, which may be, for example, an IEEE 802.11 public network or a different wireless network; and node 250 is connected to public data network 270 such as the Internet via a direct internet connection or indirectly through LAN 265. FIG. 2 depicts exemplary interface terminals computer 295, tablet computer 285, and phone 290. Tablet computer 285 and phone 290, which may connect to BNES 200 via wireless local network 260 and WLAN 275 and also may send and receive SMS texts (not depicted). Computer 295, which may be a desktop PC, laptop PC, or any other form of computer, may connect to BNES 200 via any or all of wireless local network 260, LAN 265, public data network 270, and WLAN 275. Exemplary interface terminals computer 295, table 285, and phone 290 may be used to perform control, monitoring, management, administrative, and/or security functions on BNES 200. Also shown in FIG. 2 is an optional central station 280 which includes one or more interface terminals and which may connect to BNES 200 via any or all of wireless local network 260, LAN 265, public data network 270, and WLAN 275.

FIG. 2 also illustrates several exemplary use scenarios for a building network emergency system. FIG. 2 shows a fire 227 at location 225 on the second floor of the building. A conventional fire alarm 229 has sensed the fire and activated the building's primary fire alarm system (not depicted), which has alerted the local fire department. At exit location 235, on the first floor of the building, is a first responder 237 who has just arrived to the scene of the fire in response to the alert to the fire department. At exit location 215, on the third floor of the building, are people 217 responding to the fire alarm and attempting to exit the building safely.

In one use scenario depicted in FIG. 2, BNES 200 includes central station 280. By retrieving sensor readings and/or camera images from nodes 210, 220, 230, 240, 250, central station 280 can pinpoint the current location of the fire at exit location 225, evaluate the intensity of the fire at exit location 225, track the history of the fire through the building, and predict where the fire might go next. In the scenario shown in FIG. 2, it would be unsafe for people 217 to use exit location 215 to flee the building because they would run downstairs into dangerous proximity to fire 227. Central station 280 can use the loudspeaker and/or alert lighting in node 220 to instruct people 217 to use a different exit location on the same floor, for example, exit location 205, to avoid running into the fire. Central station 280 can also use the loudspeaker and microphone at node 240 to inform first responder 237 of details of the fire and the status of building evacuation.

In another use scenario illustrated in FIG. 2, central station 280 may be inoperable or unstaffed. By autonomously retrieving and evaluating current and archived sensor readings from its own memory and from nodes 210, 230, 240, and 250, Node 220 can generate a heat map of the building, pinpoint the current location of the fire at exit location 225, evaluate the intensity of the fire at exit location 225, track the history of the fire through the building, determine (by comparing the heat map to a local copy of a building evacuation map) that any evacuation routes that include or go near exit location 225 are not safe, and identify the closest exit locations that are safe, for example, exit location 205. Node 220 can act on this information by broadcasting a prerecorded alarm message and displaying alert lighting that instructs building occupants to avoid exit door location 215 and instead use exit door location 205. Similarly, by autonomously retrieving and evaluating current and archived sensor readings from its local memory and from nodes 210, 220, 230, and 250, node 240 can pinpoint the current location of the fire at exit location 225, evaluate the intensity of the fire at exit location 225, track the history of the fire through the building, and predict the future path of the fire. Arriving at node 240, first responder 237 can use a tablet or phone (not depicted) to retrieve this information from node 240 via wireless local network 260. From node 240, first responder 237 can also retrieve streamed or archived camera images from nodes 210, 230, 240, and 250 to visually evaluate the fire and/or look for people needing assistance, and first responder 237 can use the microphone and loudspeaker in node 240 to communicate with occupants or other first responders at nodes 210, 220, 230, and 250. First responder 237 can also retrieve stored building plans and other building reference data from node 240 to evaluate the optimal strategy for evacuating occupants and suppressing the fire.

Figure 3:
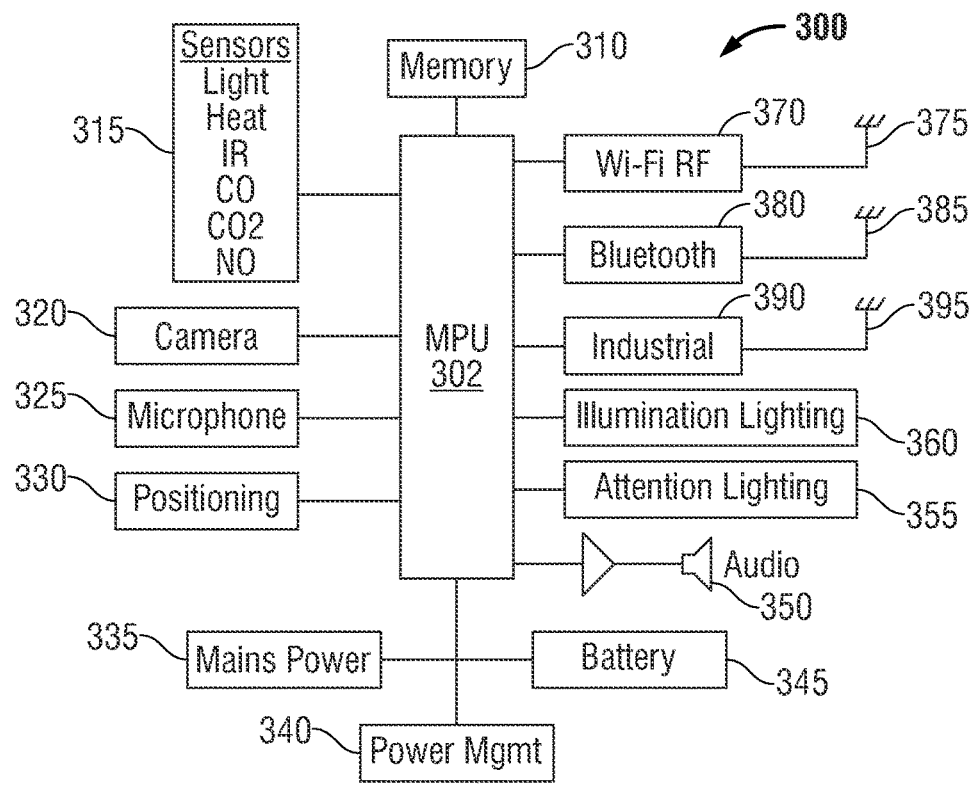
FIG. 3 is a block diagram showing components of an embodiment of a node unit.

FIG. 3 is a block diagram showing exemplary components of an embodiment of an exemplary node unit 300. Exemplary node 300 includes a microprocessor unit (MPU) 302. Node 300 draws power from a battery power supply 345 and building mains power 335. Power management device 340, operatively coupled to MPU 302, battery 345, and mains power 335, ensures that battery power supply 345 is charged and activated when mains power 335 is not available. MPU 302 is operatively coupled to one or more wireless transceivers, including, in an embodiment, one or more 802.11 transceiver(s) 370 and antenna(s) 375, a Bluetooth transceiver 380 and antenna 385, or any other form of analog or digital radio transceiver 390 and antenna 395. The term transceiver, as used herein, includes any radio equipment for transmitting and/or or receiving wireless signals and includes transceivers and transmitter-receivers. MPU 302 is operatively coupled to a memory system 310 for storage of program instructions, control data, and building data. Node 300 includes an emergency light system including illumination lighting 360 and alert (or attention) lighting system 355. The emergency lighting system in an embodiment is controllable by MPU 302. Node 300 includes sensors 315, media input devices such as microphone 325, camera 320, and camera positioning system 330, and media output devices such as audio loudspeaker 350, all controllable by MPU 302.

Embodiments of microprocessor unit (MPU) (or processor) 302 may include a single microprocessor, a shared microprocessor, a plurality of individual processors, some of which may be shared, and one or more microprocessors coupled with digital signal processing circuitry and components, including A/D and D/A converters, multiplexers, application specific integrated chips, field programmable gate arrays, programmable logic controllers, device controllers, and similar devices, control components and circuitry for controlling the sensors and input/output devices, control components and circuitry for controlling the radio transceivers and other communications components, network interface components and circuitry, control components and circuitry for processing video signals, audio signals, and any combination thereof. Embodiments of memory system 310 may include combinations of random access memory (RAM) and other volatile memory, flash memory, ROM, PROM, EPROM, and other non-volatile memory. In an embodiment, node 300 may include 512 GB to 1TB flash memory for storing any kind of information or data used in embodiments described herein, including program instructions, configuration data, building data, network data, tables, logs, sensor data, media input data, building node maps, dynamic virtual maps, building environment data, building reference data, and node identification data, and 1 GB of RAM for working memory. The functions, methods and process steps described herein, including any functions, methods or processes described with flowcharts, flow diagrams, pseudocode, algorithms, or other description of a linear or programmable processes, can be implemented as software or MPU instructions that, when loaded or embedded into memory and executed or performed by the MPU, cause the node to perform the methods and process steps.

Node unit 300 operates in an embodiment as a self-powered Wi-Fi access point (e.g., Hot spot) and router connecting to all other node units in the installation through Wi-Fi radio frequency, Bluetooth, or other wireless radio communication as well as one or more non-system Wi-Fi access points to connect to the web. The node units may be configured to provide radio communication between each of the nodes. For example, wireless radio communication, e.g., IEEE 802.11 based Wi-Fi radio communication, includes a beacon, e.g., 802.11b or g SSID and WEP or WAO data turning the Node into an Access Point (AP), router such as a wireless router (full RIP) supporting a) a private network and b) a public network to an Internet access point and ISP (e.g., RFC 2453 http://tools.ietf.org/html/rfc2453), server for managing files on the individual nodes, and host with the server creating a web hosting node (e.g., RFC 871 http://tools.ietf.org/html/rfc871). In addition, node 300 may include other means for communications connectivity. For example, embodiments of node 300 may include a network interface controller (not illustrated) to connect to a wired local area network (LAN) or WAN such as an Ethernet network. Other exemplary forms of wireless radio communication suitable for embodiments of node 300 include cellular telephone communication, SMS text messaging, email, 800 mHz industrial radio band, and digital enhanced cordless telecommunications (DECT).

In an embodiment, the nodes may be battery operated using 'Smart Energy Modules' based on current storage cells such as standard commercial off-the-shelf lithium-iron phosphate (LiFePO4) batteries operating on any voltage from 3 to 300 volts, or from 24 to 240 volts, AC or DC any frequency up to 5000 Hz of Pulse or Alternating current, to charge the contained batteries. An embodiment uses a power management system to keep the node batteries charged.

Illumination lighting system 360 may be configured as area lighting complying with life safety requirements. Alert lighting system 355 may be configured having multiple color LED lamps to attract attention of first responders. In an embodiment, alert lighting system 355 may comprise an LED display screen or LED lamps configured to display text-based messages (for example, "EXIT" or "DANGER DO NOT USE THIS EXIT") or warning signs or symbols supplied by an interface terminal or previously stored in memory and to add blinking, running lights, or other lighting effects to attract attention of first responders or building occupants.

The nodes may further include one or more sensors in any shape, form or configuration known by those of skill in the art to collect types of building environment data. Building environment data detected by sensors may include changes and levels for local energy (e.g., visual light, infrared, temperature, magnetic, vibratory, motion), relative humidity, smoke and particulate matter, carbon monoxide (CO), carbon dioxide (CO2), nitrogen oxide (NO), relative humidity, hydrocarbon vapor, sounds, burglar alarms and other intrusion detection, loud sounds (such as gunshots), and power supply characteristics of the battery power, mains power supply, and battery charging system. Embodiments include a fire detection system may also be included. Sensors may be digital or analog; and in embodiments 'rate of change' sensor data is recorded and stored. A user interface provides a way for the layman to set up alarm triggering thresholds that will send emails or SMS through the Public Wi-Fi Network to selected individuals.

Embodiments of node 300 may include one or more media input elements in any shape, form or configuration known to those of ordinary skill in the art. Node 300 may include one or more cameras, which may be of any type, including but not limited to video cameras, VGA color cameras, still cameras, and CCTV. The cameras may be configured to record or take still shots at periodic intervals (e.g., every 30 seconds) and store the recordings or still shots in memory for review by first responders and other personnel through, in an embodiment, through a Wi-Fi authorized user port. The camera in embodiments may also be accessed in real time through the wireless local network. For example, video output of the camera may be streamed from one node to another. Node 300 may include a camera positioning controller that provides local and/or remote pan-tilt-zoom control over the camera. The camera positioning system may be used determine the node unit's relative location with respect to other node units. Node 300 may also include one or more audio microphones, which can be accessed remotely (in an embodiment, through the Wi-Fi Authorized User Port) to listen to the local sounds. Node 300 may include two or more microphone elements along with a control to perform phase adjustment between the two or more microphone elements to remotely steer the directional sensitivity of the audio sensors. Nodes may also include an intercom that listens to a person talking and automatically adjusts the microphone(s) to cancel background noise, levels, and equalization for optimum intelligibility. Node 300 may also include other media input elements not depicted in FIG. 3, including, for example, a touchscreen, touchpad, pointing device, keyboard, or keypad associated with a display screen or display area.

Embodiments of node 300 may include one or more media output elements in any shape, form or configuration known to those of ordinary skill in the art. Node 300 may include one or more variable volume loudspeakers to allow those nearby to hear audio at the node. Node 300 may include a loudspeaker that will output messages recorded in the unit's memory when activated by sensors, fire system or power failure. Speakers may also be accessed remotely (in an embodiment, through the Wi-Fi Authorized User Port) to be one half of an intercom system. Node 300 may also include other media output elements not depicted in FIG. 3, including, for example, a display screen or display area having an illuminated display that exhibits node identification information such as the node location, node unit number, or other text. Such information can be sent by or to an authorized user if the environment is too loud for aural communication.

The nodes may be configured in various ways, such as in the form of emergency egress lighting and signage appliances. These units may be defined and mandated by the Fire Code (generally reflections of OSHA and the National Fire Protection Association (NFPA) Codes) and are required for all non-residential occupied buildings by the local Building Codes. Embodiments include one or more nodes used in the building network emergency system having one or more modular components. That is, one or more modular components may be plugged into the nodes or removed depending on the desired configuration.

Figure 6A:
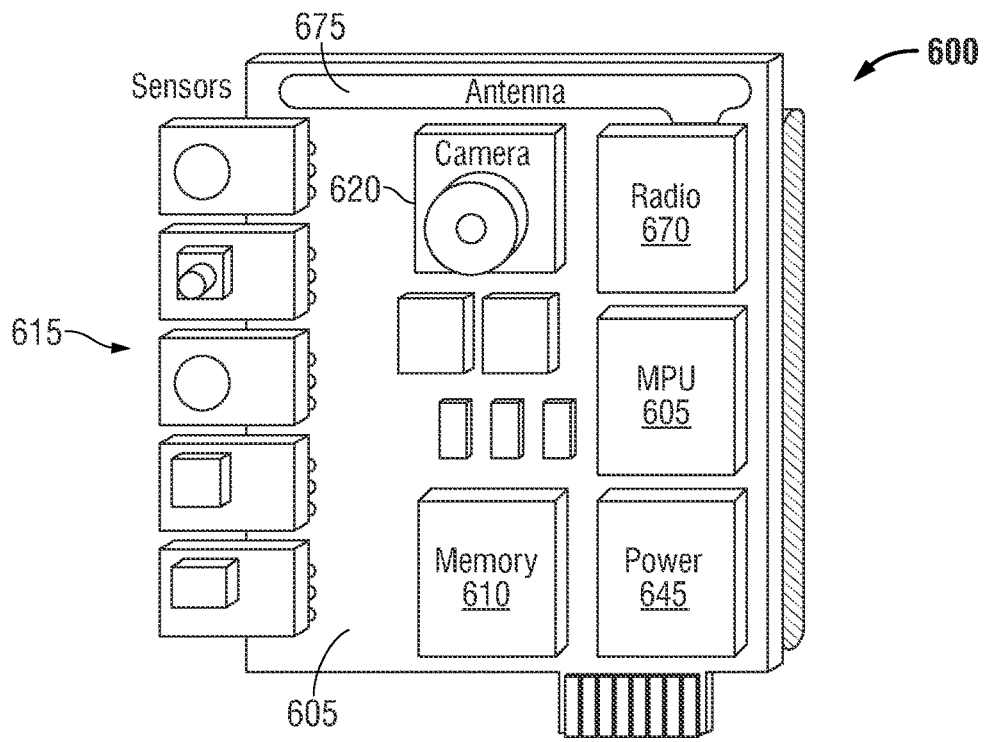
FIGS. 6A, 6B and 6C depict different views of exemplary components of an exemplary node unit.
Figure 7A:
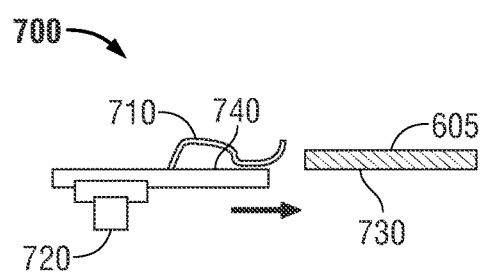
FIGS. 7A and B illustrate an exemplary structure for coupling a sensor to a node unit.
Figure 7B:
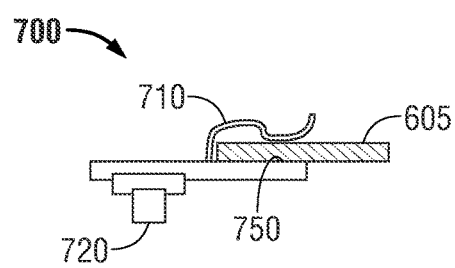

FIG. 6A illustrates the modular configuration of an embodiment of a node unit. Basic module 600 includes a socket for a camera module 620 and multiple sockets or connection areas (not depicted) on mounting board 605 configured to operatively couple to sensor modules 615. In an embodiment mounting board 605 may be a printed wiring board or a printed circuit board. As shown in FIGS. 7A and 7B, an exemplary sensor 720 is mounted on mounting board 605 and secured via a spring clip 710. In an embodiment, sensor 720 is coupled to the MPU, memory, and control components via a local system bus (not depicted), and sensor 720 is directly connected to the local system bus by a tab socket or other type of interconnection. In one embodiment, copper interconnects at site 740 on sensor 720 connect at site 750 to corresponding copper interconnects 730 on mounting board 605. When mounted on the mounting board 605 and coupled to the local system bus, the sensors 615 are configured to identify themselves to MPU 605 (e.g., plug and play). Also shown in FIG. 6A are modular components for memory 610, power/battery 645, radio transceiver 670 and associated antenna 675. Each modular component can be replaced with a different component as needed to comply with regulatory or performance requirements.

Figure 6B:
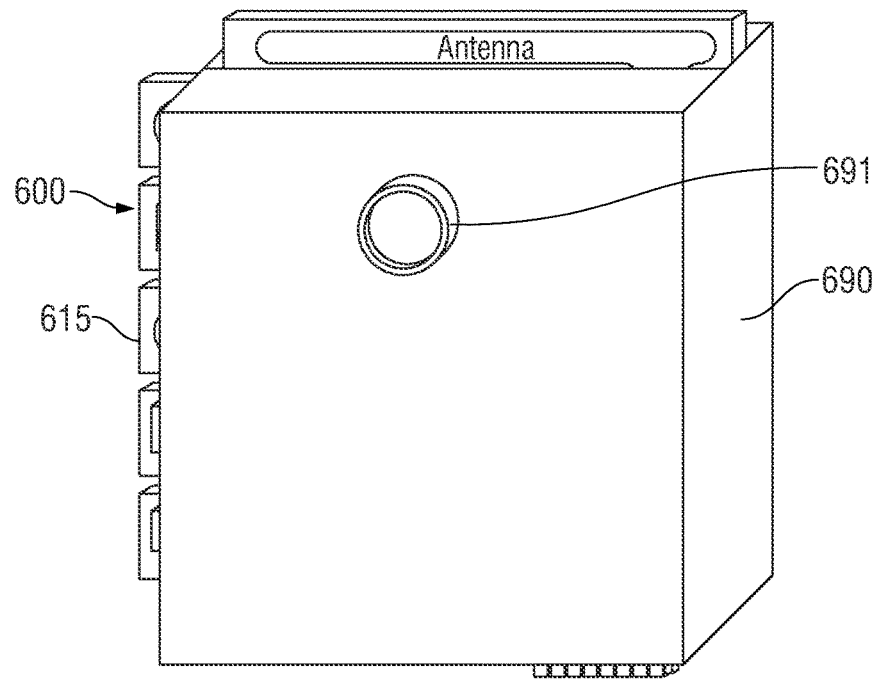
Figure 6C:
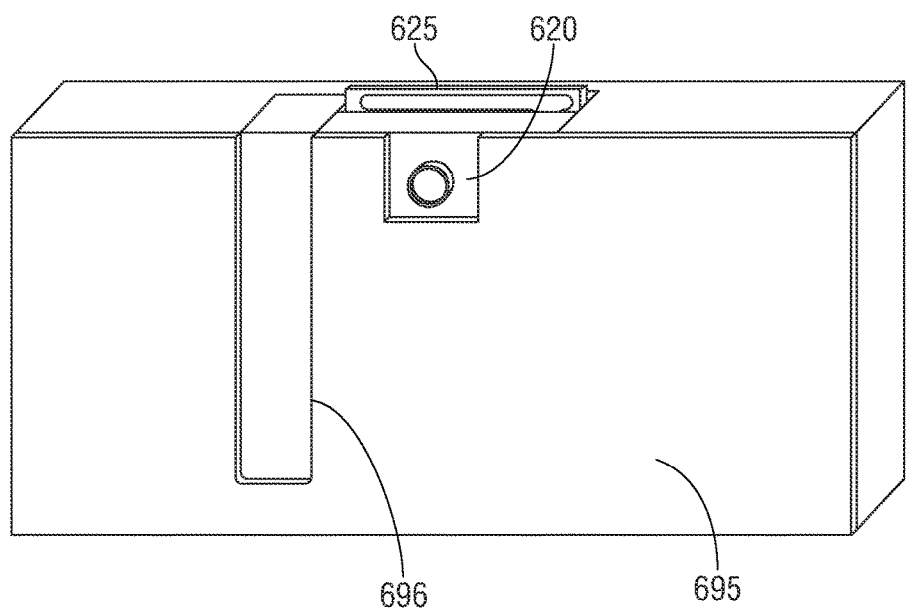

As shown in FIG. 6B, basic module 600 can be enclosed in a case 690. Case 690 does not cover sensors 615, and case 691 includes an opening for the lens of camera 620. Case 690 may be protective, and in an embodiment is a snap-lock case. FIG. 6C depicts an embodiment of a node unit showing how the node package, including basic module 600 enclosed in case 690, would fit into node housing 695. Outer node housing 695 includes a screen 696 to allow ambient air to flow over the sensors and openings for camera 620 and antenna 675.

Figure 8:
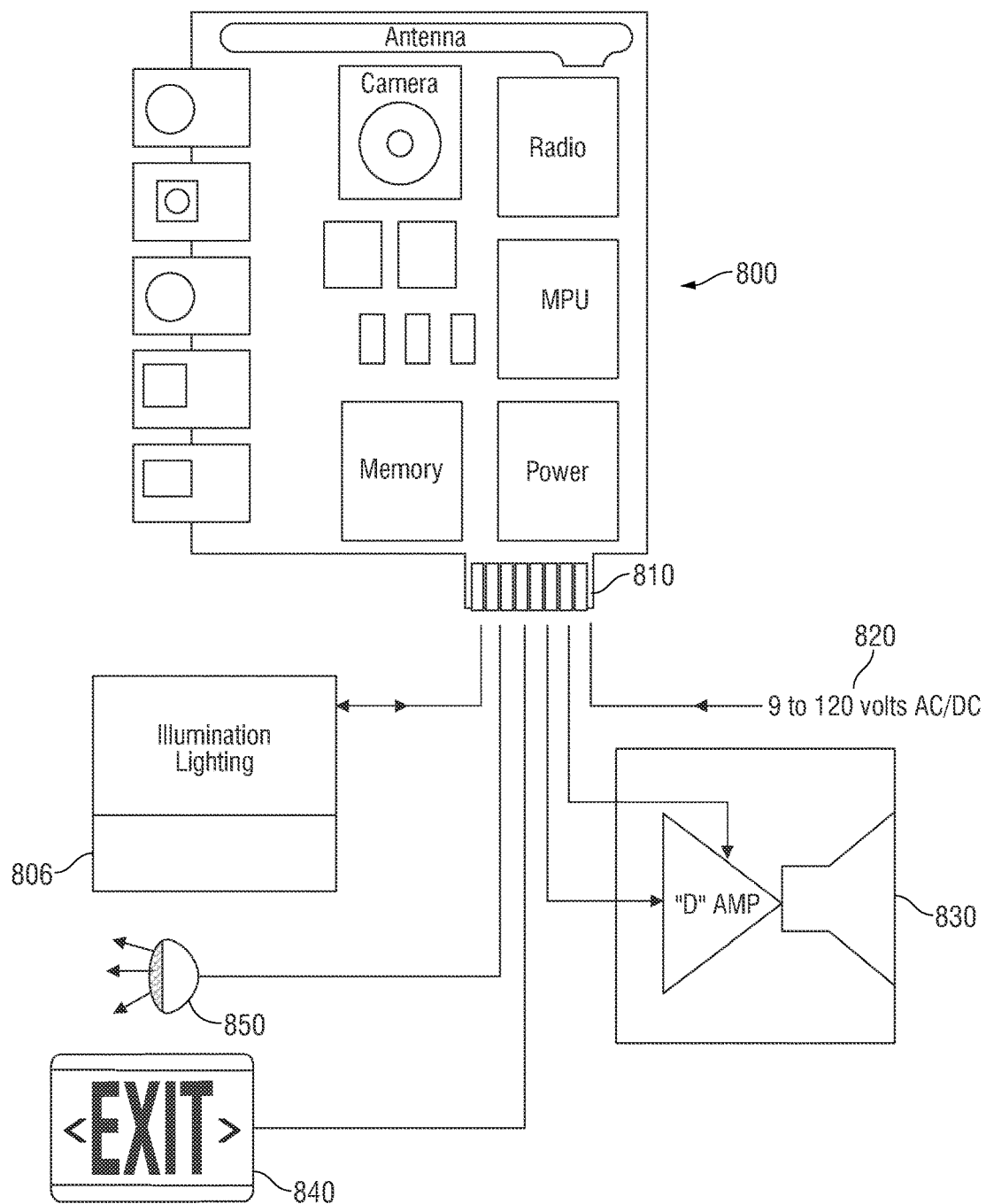
FIG. 8 illustrates the components of an exemplary node unit.

FIG. 8 depicts an embodiment of an interface 810 between basic module 800 and the node components that are located in embodiments outside of, on or in the outer packaging of the node unit or outside of node housing 695 (FIG. 6C). Interface 810 couples the components of basic module 800 (MPU, camera, sensors, power/battery) to mains power supply 820, loudspeaker 830, alert lighting 840, microphone 850, and illumination lighting 806.

Figure 9A:
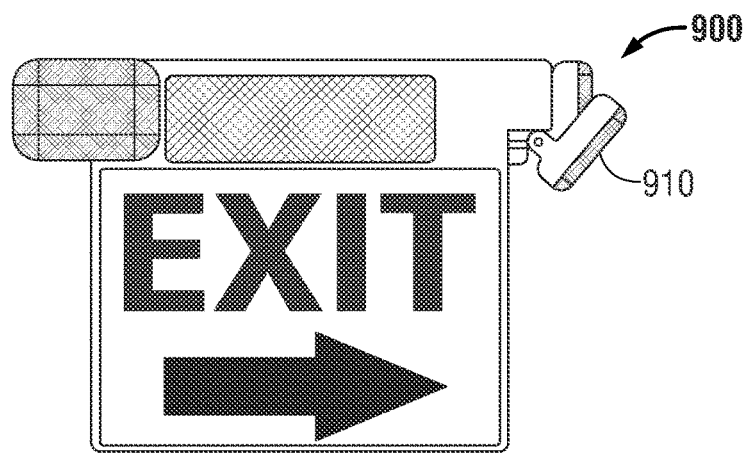
FIGS. 9A, 9B, and 9C depict alternative views of an exemplary node unit.
Figure 9B:
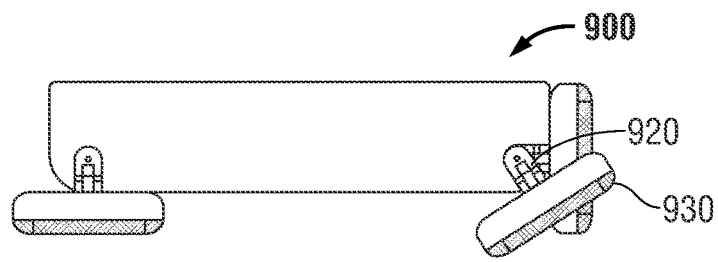
Figure 9C:
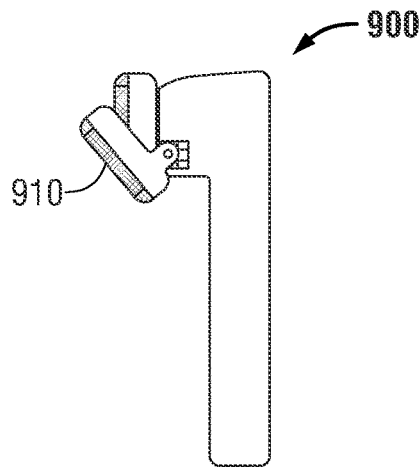

FIGS. 9A, 9B, and 9C depict alternative views of an exemplary node unit 900 depict exemplary swivel lighting brackets 920 for the illumination light system 930. FIGS. 9A, 9B and 9C show different orientations of illumination lamps 910.

Each node is configured to perform one or more emergency response functions. In the event of a power failure, fire alarm, or other declared emergency, each node activates and operates the illumination lighting system and the alert lighting system of the node. The emergency lighting and signage of the nodes may be operated. Each node may also configured to provide mandated local emergency egress audio messaging to provide building inhabitants with location-specific prerecorded exit procedures when triggered. In an embodiment the specific emergency response of the illumination lighting system, the alert system, and the emergency audio egress messaging can be varied based on the type of emergency or other factors such as, for example, a specific alarm situation identified by the node.

The BNES, in an embodiment, is secondary to a primary alarm system (for example, smoke alarm, fire alarm, intrusion detection) for the building or building complex. A node unit may be coupled to a primary alarm system. Primary alarm systems may be a fire control panel in a building wherein all temp sensors and manual activation switches are monitored. The panel will activate sprinklers as well as separate audible and visual alarms. Such systems have logical sensor inputs (switch closures) that will activate them, this sensor input can be connected to an off-the-shelf box that receives a network signal (for example, an Ethernet signal sent by the node via the LAN, WAN, WLAN, or wireless local network). Such controller also have inputs for events like smoke detectors. A node in the BNES may be operatively coupled to a primary alarm system through a Wi-Fi connection directly to the primary alarm system, a hardwired connection from a node that has a LAN connection, or a Wi-Fi connection over the internet. The node is further configured to perform one or more alarm modalities in response to an alarm signal received from a primary alarm system.

The BNES, in an embodiment, can be configured to interface with the BACnet (building automation and control network) of a building. When coupled to the building BACnet of a building, the sensors of the BNES can provide data for other controllers such as the HVAC and environmental controllers increasing the 'resolution' of the BACnet's sensors system at no additional cost. Through the building's BACnet system the BNES can check for consistency in variable assignment in other systems, as simple as answering the question 'do all system know that the temperature here is supposed to be XX degrees'? The BNES can take usable data from another system using BACnet to expand awareness of other points in the building.

Each node unit is configured to transfer data over the system network in a number of manners. For example, node units are configured to provide color video as a data stream for transmission over the network, audio from the microphone(s) as a data stream for transmission over the network, provide public announcements (PA), paging, and voice communication from the network, and provide environmental data over the network. Node units are also configured to manage a file server system of various data types. In embodiments, a node may store audio file data for playback during an emergency to give inhabitants at a particular node unit location specific information about how to exit from the building, or a node may store audio data recorded from a local microphone or audio data transmitted from another node for playback for a specified period of time, for example, a 1-hour storage loop). The node in file server mode may also store, but is not limited to storing, diagnostic data from tests forming a log for later retrieval, archival diagnostic data from other nodes, video data from the local cameras, both streaming and snapshot, archival video data from other nodes, and building reference data, including web pages or other documents containing drawings, manuals, building reference images, text and drawings, and other building infrastructure data and information. Each node stores in its local memory the building data obtained by its local sensors and other media input data, for example camera images or audio recordings, and each node is configured to transmit to other nodes the building data and other data it has stored and to receive and store in its local memory building data and other data from other nodes.

Each node unit is configured to perform different alarm modalities in response to an alarm condition or error condition. Exemplary responses to an alarm condition include transmission of email or SMS text messages, generating a cell-phone transmission to a pre-designated number, broadcasting an error message to all nodes in the BNES, broadcasting an alarm message to all nodes in the BNES, activation of the node resident audio enunciators (alert lighting system and local emergency egress audio messaging), blinking the node's alert lighting system or illumination lighting system, sending machine activation codes via radio to a building resident BACnet protocol, broadcasting a message to all or any interactive terminals coupled to the node, and broadcasting a message to any electronically-activated Human Interface Device. A Human Interface Device preferably covers anything that people use to do anything technical or to interface with a system, including mice and pointing devices, monitors and display devices, keyboards, keypads and touchscreens, vocal controls, and eye-ball readers and retinal scans.

Each node is configured to identify and respond to specific alarm scenarios. Exemplary alarm scenarios include a power failure, self-test failure, disappearance of another node, unusual rate-of-change readings, and a change in a general Threat Level.

In an exemplary power management system, separate logs may be kept of the start time, length of charge, current level, and voltage. In an embodiment, one log stores readings obtained on a regular basis, for example an hourly basis, and retains a week's worth of readings; and the last reading in a week may be stored in a separate log containing weekly-only data. Both logs may be reviewed regularly for patterns based on the manufacturer's specifications. In the event of a violation of acceptable patterns, an alarm for maintenance is issued. In an embodiment, an alarm for maintenance is sent to the network system and sent as email(s) to specified accounts. In the event the voltage from the battery falls below a specified level (for example, a threshold level stored in memory) the node responds, in an embodiment, by switching to a reserve super capacitor supply to power the radio and MPU system, sending out an alert to the other nodes, and then going into power-down listen-only mode. In an embodiment, the node monitors the main power supply of the building and, by communicating with other nodes, detects a building power failure and issues an alarm. In one embodiment, each node is configured to broadcast a main power failure notification alarm to the BNES when it detects failure of the main power system, and when the power failure notification alarms generated by nodes in the network cross a user-selectable threshold, a system power failure alarm is issued. An exemplary user-selectable threshold may be crossed when the network system reflects main power failure notification alarms by all nodes, or alternatively, a majority of nodes, or alternatively, nodes on different power circuits. A system power failure alarm can be, in an embodiment, an email issued by a designated node. Alternatively, the node that issues the system power failure alarm can be determined based on the current configuration of the network. For example, the active node with the highest MAC (media access control) address (or other unique identifier) can be the node that issues the system power failure alarm.

The node units may be tested periodically as required by various regulations. For example, certain regulations require that the node units be tested every month (e.g., 30-second light test) and annually (e.g., 90-minute light test). Preferably a self-testing node unit measures the current drawn with the lights on and implies the right amount of light has been produced. The node unit illumination systems having LED's may use light sensors placed between the LED's to read the LED's outputs.

The nodes are configured to run performance diagnostics to test the node's emergency lighting system, that is, the node will test itself regularly in compliance with current and local performance testing requirements. If a performance capability is found to be in error a notification will be broadcast to all nodes in the BNES and directed at the appropriate building management level. If in compliance the success of the test will be logged for subsequent retrieval, for example, during fire, insurance, or maintenance inspection.

One or more node units, at one time or another, may become inoperative. The network system is configured to adjust to one or more node units becoming inoperative (e.g., leaving the system). A node unit leaving the system because it has become inoperative may be considered an alarmed event, and the assumption is that something is wrong and outside help is immediately needed to restore the integrity of the network. Generally, node units may be configured accordingly to various rules or constraints. First, each node unit should have at least two direct connections to other node units. In most cases a given node unit will have more than two direct links with other node units. Signal strength among node units may be used as a guide to determine a relative distance between the node units, and the strongest link may be selected for a connection between the node units. Second, should a node have more than three connections then it will prioritize the first three connections (e.g., one, two, three . . . ) in order of signal strength. Third, node units may be aware of all other node units in its field of detection and in the network. In an embodiment, the first can be determined by radio signal strength, and the second can be from a router table or other data structure that stores information about the current state of all other nodes in range of the node. Should any node unit become inoperative so as to drop out of the network, the detecting node(s) may broadcast a drop-out notification to the other nodes in the BNES, and a node unit that establishes contact with the missing node unit will return a missing-found notice. If a node unit receives no such notice within a given period of time, it may remove the inoperative node unit from its stored node unit inventory.

A node unit is configured, in embodiments, to calculate rate-of-change data for some or all sensor readings. Normal boundary conditions can be specified for the rate-of-change value for each sensor type, so that when the rate-of-change for sensor X is outside of normal conditions the Node will broadcast an alarm message identifying the sensor, the sensor value and the unusual rate-of-change value to identify an "alarming event relating to sensor X". At that point, the node can evaluate rate-of-change and other sensor readings from the node and other nodes to identify the epicenter, flow rate and flow direction of the alarming event. A node may use other sensor readings to learn more about the alarming event.

Figure 21:
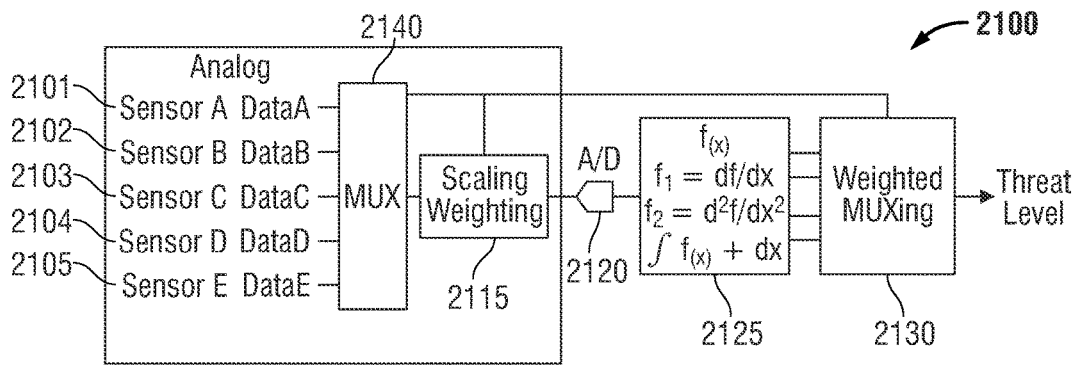
FIG. 21 depicts an exemplary method of quantifying a threat level.

FIG. 21 depicts an exemplary method of quantifying a general threat level for a node unit having analog sensors 2101, 2102, 2103, 2104, and 2105. Exemplary analog sensors include smoke, temperature, carbon dioxide, carbon monoxide, atmospheric pressure, humidity, and mains power supply quality. Sensor output from each sensor is processed by an analog-multiplexer 2140 and an Analog-to-Digital convertor 2120 to create a digital signal for signal processing by MPU. Before A/D conversation some selective scaling and weighting 2115 will be done to the signal to control bandwidth and dynamic range of the analog signal to optimize for the A/D conversion process. The MPU processes the digital signal in several different ways, including generating first and second derivatives and integration 2125 to reveal all aspect of changes with time along with absolute values. The result values are combined in a weighted multiplexing process 2130 wherein the influence on the result by a specific input is dependent on of the result is not linear but follows a curve of importance vs. level determined in advance and provided as a system parameter. The result is a single value generated by a NODE that defines a general Threat Level at that instant in time. Comparing the general Threat Level value with Threat Level values of other local nodes defines a map of the threat levels throughout the BNES. The node unit can also calculate the rate of change of the Threat Level variable and compare the rate of change of its local Threat Level with the rate of change of Threat Level of other node units to map out the severity of the situation and general direction of change, both in location and amount. Separate algorithms once alerted by the general Threat Level will look at the finer details creating separate maps for smoke, heat, CO2 doing the same process and given the directional changes in second derivatives will be able to project where things will go in the near future.

The person of ordinary skill can create special transfers to get additional perspectives on the data changes. As examples, Fourier Space transformation reveal patterns in the changes with respect to themselves, and Hilbert Space transformations offer completeness for forecasting values, and Fourier Space and Hilbert Space transformations can be used to generate visual displays that visually demonstrate changes in Threat Level of a Node, relative changes in Threat Level, rate of intensity change and direction.

In the case of a sudden event (for example, a plane crashing into a building or an explosion), the sudden change of conditions from multiple nodes quickly defines the epicenter and can show first responders exactly what happened. By combining and evaluating sensor readings from multiple nodes any node can map where the damage occurred, where it started, and how it is spreading. The BNES has the unique ability to hear unseen structural fracturing and to further locate dynamic issues.

Gunshots are another example. The sound of a gunshot has a unique sonic signature, including a very rapid increase in energy above 1.25 kHz that has a sharp leading edge with a tapering trailing edge, corresponding to the explosion and room reverberation, and a simultaneous boost of very low frequency energy from the physical displacement from the bullet and the secondary thermal gas ball after the propellent discharge. A person of ordinary skill in the art can devise and build a gunshot sensor using a pair of filters and/or a pair of op-amps operating as gyrators and logic familiar to one of ordinary skill in the art. When a node unit recognizes the sonic signature of a gunshot, sensor readings from multiple nodes can be synchronized to identify estimated location of the shot, the location of earlier events, and the apparent direction of travel of the event.

Figure 12:
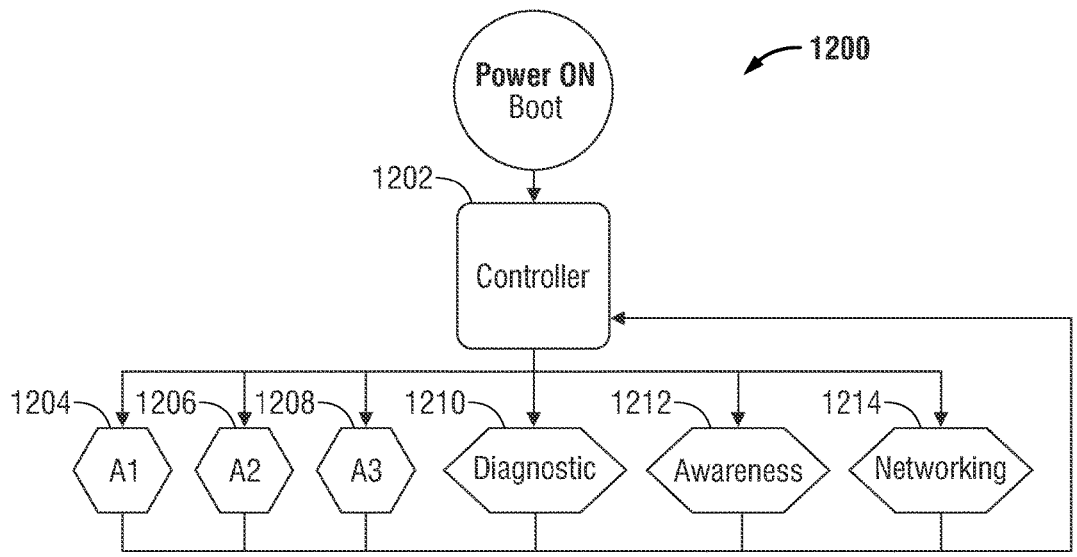
FIG. 12 illustrates an embodiment of process flowchart showing steps performed by software of the node units.

FIG. 12 illustrates the general components of an exemplary software program 1200 that is performed by the MPU in an embodiment of a node unit. The various tasks are processed and activated by a controller 1202. Controller 1202 preferably processes the task in a round-robin type sequence, although some tasks preferably process asynchronously and generate interrupts when completed. In this process, information or data will be acquired from sensors, media inputs, or network connections and stored by a node, information and data will be transmitted to another node, and information and data will be received from another node. Tasks perform various general functions (embodiments of which are shown at 1204, 1206, 1208, 1210, 1212, 1214). Task 1204 creates a private ad-hoc Wi-Fi distributed network based on IEEE 802.11 Packet Protocol and communications standards. From the perspective of any given node unit, the process includes determining what other node units may be contacted through the Wi-Fi radio system either directly or indirectly (e.g., through one or more jumps or relayed connections). The acquiring node unit also collects data including the signal strengths of both sides of the connection along with the MAC addresses of all direct connections of the acquired node using this data to build a router table (e.g., a network map of all known node unit connections). The process is iterated again and again until all node units are known along with the Router route to get to them. Task 1206 contacts all previously acquired node units listed in the Router Table (e.g., the network map) to verify their direct connection MACs and update the signal levels of each end of the link. Task 1208 provides a public network connection (e.g., an access point) for communication with external authorized mobile users.

Diagnostics (shown at 1210) are run to determine the operational state of the node unit, sensors, battery, and lighting through dynamic testing. Awareness (shown at 1212) evaluates all the data from the system elements including sensors, diagnostics, and the other node units of the network. If it is assessed that data is out of operational bounds or that a sensor variance pattern is sufficient, an error code will be generated for the controller 1202 to act upon. Networking (shown at 1214) determines and analyzes the state of the network and other node units, sending data for, receiving data, routing data to other node units for archiving and active back up. This will include connecting to a WAN based external network for emails, reports, alerts, and cloud backup, and the application of a public network connection for access by authorized users.

The BNES system space (or network system space) is the collective of all the individual node signal spaces. The network system space preferably may be defined by the general shape of the building in which the network resides. Nodes that are not directly linked may still be able to communicate indirectly through one or more intermediate (or bridge) nodes. That is, the nodes may be configured to relay data from one node to another. To accomplish this each node may be configured to autonomously function in a variety of configurations. Exemplary configurations include the following. Each node may be configured to function as a beacon to periodically seek out other nodes is its radio range and to make contact with distal nodes (part of the 802.11 Management Frame family). Further, each node may be configured, in embodiments, to function as a router to pass data packets along to appropriate other nodes based on Installation Preferences and/or routing information protocol. Further, each node may be configured to function as a server with attached SSD memory and Block-loss correction management. Nodes may also be configured to function as a scheduler-control to manage a constant flow of data between nodes based on the installation preferences. Further, each node may be configured to function as a web-host offering web-pages from the memory system. Further still, each node may be configured to function as a management structure to coordinate all operational features. The network system preferably employs a closed ad-hoc network.

Figure 5:
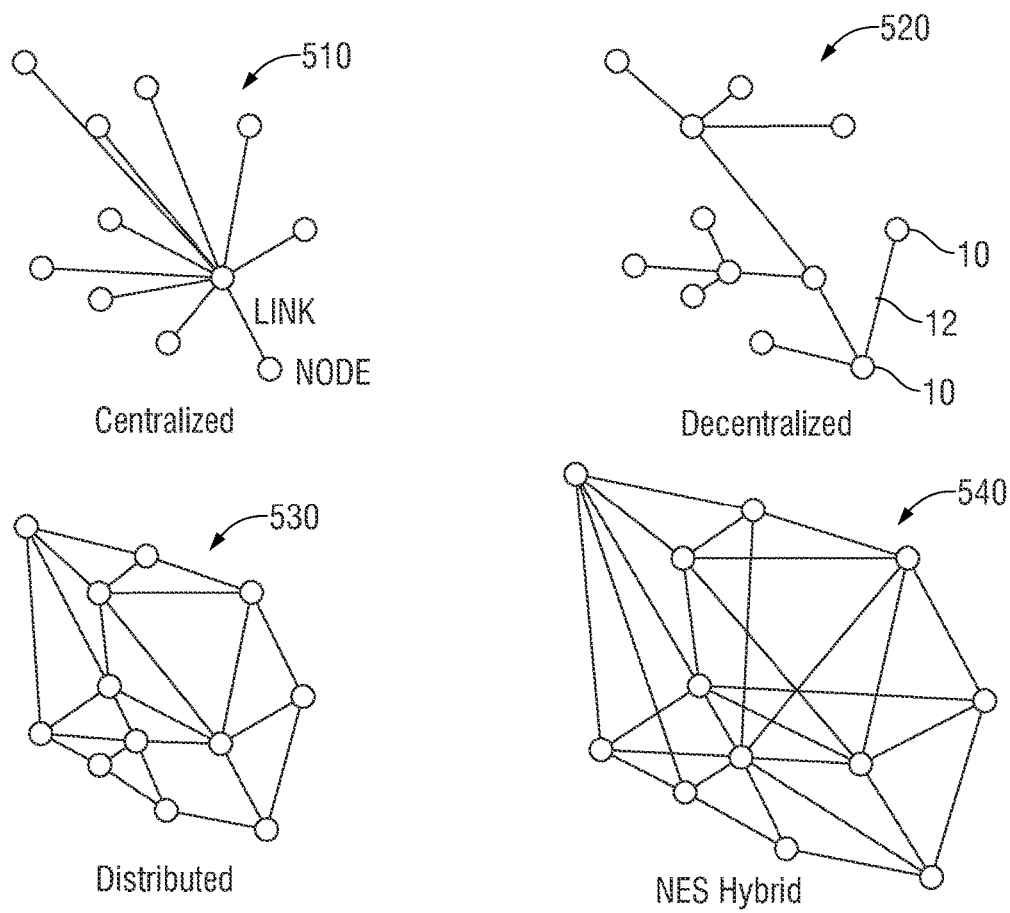
FIG. 5 illustrates different node structure embodiments of an exemplary building network emergency system.

FIG. 5 illustrates different node structure embodiments of an exemplary building network emergency system. Referring to FIG. 5, a building network emergency system configured to connect the various individual nodes 10 via links 12 (e.g., Wi-Fi Radio links) to other individual nodes 10. The network system may be private in nature and may transfer information around the physical networking platform provided by the multiple nodes in close proximity. Spread throughout a building complex, the topography of embodiments of a building network emergency system may be centralized (510), decentralized (FIG. 520), and distributed (530), or hybrid (540) in nature.

Figure 4A:
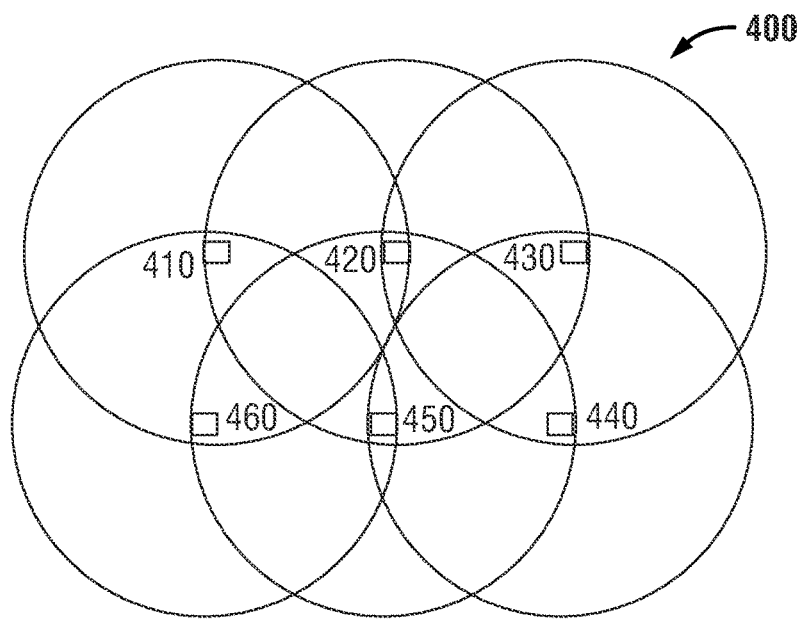
FIGS. 4A and 4B illustrate different configurations of nodes directly and indirectly connected in an exemplary building network emergency system.
Figure 4B:
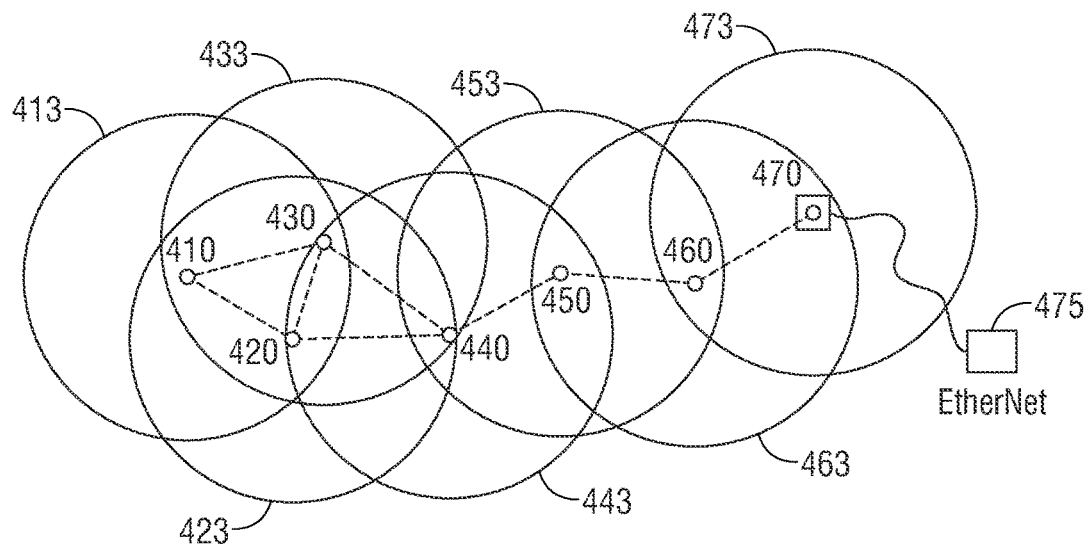
Figure 22:
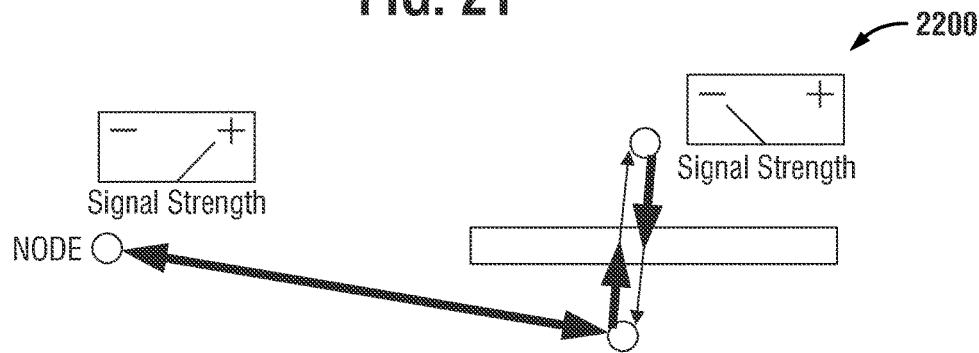
FIG. 22 illustrates variations in signal strength.

FIGS. 4A and 4B illustrate different configurations of nodes directly and indirectly connected in an exemplary building network emergency system 400. Overlapping radio coverage areas create a Venn-like image of the network which is anchored by a hard-wire connection 475 to the LAN by one or more special interface nodes 470. As shown, each node 410, 420, 430, 440, 450, 460, and 470 has a "sphere of influence" (413, 423, 433, 443, 453, 463, and 473, respectively) that is the range at which it is able to reliably communicate with other nodes via the wireless network. With reference to FIG. 4B, Nodes 410, 420 and 430 are within range of each other and can be directly connected via the wireless network, but node 450 is not within range of node 420. Node 450 can be indirectly connected (jump connection) to node 420 via node 440, which is within range of nodes 420 and 450. As depicted in FIG. 22, ceilings, floors, and walls distort space-time affect where the radio waves travel and how strong they are when they reach their destination. In embodiments, communications between nodes are full-duplex or bi-directional all times; and it would be considered an Error State if one node could receive a signal from another node but could not transmit a signal to the other node (or could transmit to but could not receive from another node), and would be reported as the loss of node link and change in the shape of the network.

In an embodiment a node will use various data structures stored in on-node memory, including a Pfile, Node Log, Router Table, Data Table, and Building Data Table.

The PFile preferably stores internally-relevant system data. This includes several tables in array form. In an embodiment the Node comes from the factory with a PFile preloaded with the system and node unit's default values. Exemplary data and information stored in the PFile includes sensor and system calibration data, performance boundaries (upper and lower limits) for sensor data defining change triggering thresholds, error triggering thresholds, alert triggering thresholds, alarm triggering thresholds, weighting factors, data retention policies, data replication policies, alarm modality configuration data, connection instructions (for example, who to call, what to connect to in the outside worlds), security command and data, preferred networking connection routes for both primary and secondary link establishment that will dictate a final router table in the node unit. Preferably the Pfile can also be revised or updated by an operator via an interactive terminal. Other data, including, in embodiments, building reference data, can be stored in a Pfile as an administrative or security function. Building reference data includes maps, evacuation routes, floor plans, HVAC and electrical diagrams, plumbing layouts, and other documents relating to the building or building complex infrastructure that a user may need; and the MPU is configured to display such building reference data to an interface terminal on request.

Each node unit preferably maintains one or more Node Logs to store a running log of events. Exemplary events stored in a Node Log include regularly-scheduled sensor readings from all sensors on the node over a predetermined time period, local sensor readings that trigger a change threshold, local sensor readings in response to a collective update directive, alarms and error messages generated by the node, and new sensor readings, alarms and error messages received from any other node in the BNES. Data will be maintained in a Node Log according to the data retention policy in the PFile. Under an exemplary data retention policy, Node Log entries for sensor data are retained at the node for 24 hours. Pursuant to the node's data replication policies, the Node Log may also store sensor data from other nodes in the BNES. Under an exemplary data replication policies: the node stores in a Node Log sensory data messages from every node in the BNES; the node stores in a Node Log sensor data for each node to which it is directly connected; the node transmits each Node Log entry to each of its DC nodes; and the node stores Node Log entries from each of its DC nodes for a different time period, for example, 48 hours. In an embodiment data from another node may be transmitted from the collecting node or stored by the receiving node in a compressed format.

Figure 14:
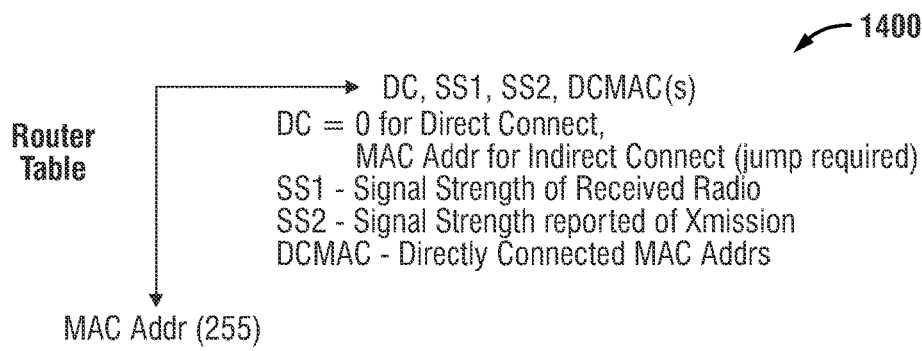
FIG. 14 illustrates the data structure of an exemplary Router Table for use in an embodiment of an exemplary building network emergency system.

The router table, in an embodiment, contains information about all node units in the BNES, how to get to them, radio transmission strength to them (SS1), and radio transmission strength from them (SS2). FIG. 14 depicts an exemplary router table 1400 as a 2-dimensional array 1400 indexed by MAC Addresses of every node unit in the network. For each node unit in the network, the array elements include: a direct connect (DC) field, which in an embodiment is 0 if the other node is a direct connect, and if the other node is a jump (indirect) connect, the value is the MAC address of another node unit that is directly connected to the node; and SS1, SS2, and a DCMAC field containing a list of MAC addresses for all nodes directly connected that node. In an alternative embodiment, the DC entry for a JC node may include a pointer to a data structure containing the path between the node and the JC node. In an alternative embodiment, the SS1 and SS2 fields for a JC node are the SS1 and SS2 levels between the JC node and a bridge node that is a DC node to the JC node. In an embodiment, the DC field may include another value, for example −1, to identify the MAC address of an 802.11 device that has responded to the node's beacon signal but is not a node in the BNES, which value can be used to filter out non-BNES nodes during the process of identifying all BNES nodes. Preferably the router table can be transmitted from one node to another.

Figure 13:
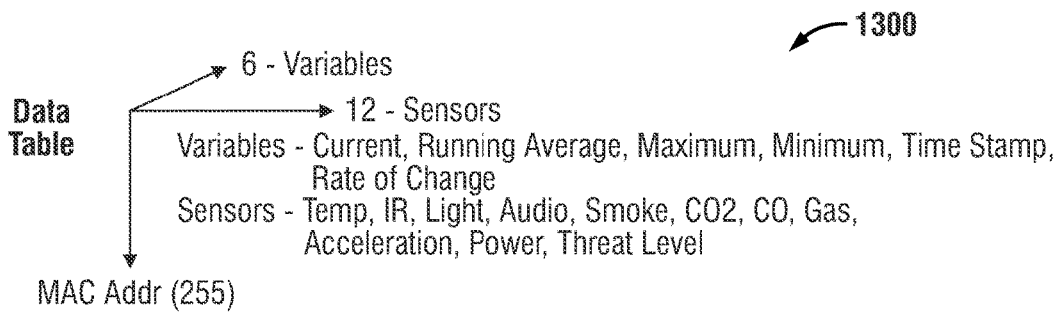
FIG. 13 illustrates the data structure of an exemplary Data Table for use in an embodiment of an exemplary building network emergency system.

The Data Table, in an embodiment, contains sensor readings for each node unit in the network. FIG. 13 depicts an exemplary Data Table 1300 as a 3-dimensional array of current sensor data for each node units in the BNES. For example, indexed by the MAC addresses of each node unit in the BNES, the Data Table stores six data values for each of 12 exemplary sensors for each node unit in the BNES. The 12 exemplary sensors are Temperature, Infra-Red, Light, Audio, Smoke, carbon dioxide, carbon monoxide, gas, acceleration, power supply, and general Threat Level. The data stored for each sensor includes the current reading of the sensor, the running average sensor reading, maximum and minimum readings over some selectable time interval (preferably stored in the PFile), a timestamp for the time of the current reading, and a rate-of-change value. The running average and rate-of-change data may be computed by the node or collected by the node from the sensor. Preferably the Data Table can be transmitted from one node to another. Each node is configured to update the Data Table with current readings from local sensors. When a node receives sensor data readings from another node, the node is preferably configured to compare the timestamp information and reject sensor readings that are older than the data currently stored by the node.

In addition to the Router table and the Data Table, each node preferably maintains a Building Data Table indexed by MAC Address for each node in the BNES. For each node, the Building Data Table preferably stores identification information, location information, and building data such as, for example, media output data, for example, camera images, building reference information, archived building data, or any other data or information. In an alternative embodiment, the Building Data Table may store addresses in memory where some or all forms of identification information, location information, and building data may be stored.

Identification information stored in the Building Data Table preferably includes node ID and a text description of the location of the node, for example, Node 23, "Bldg. A, 3rd floor, NW corner." Node identification information may be displayed at the node or revealed upon request; and node identification information preferably is broadcast to all nodes in the BNES.

Exemplary forms of location information include GPS coordinates; coordinates with reference to a local location reference system, for example, a campus map grid, or a city map; and coordinates with reference to building infrastructure maps or other building reference information such as maps of the HVAC, plumbing, electrical subsystem, and building evacuation routes. Preferably each node uses or stores the same maps and reference systems so that a first responder or other user can obtain, from one node, the location of each BNES node in relation to a designated map. In addition, the Building Data Table preferably includes relative location information, including, for example: distance between a node and each other node in the BNES, including the length of the wireless path and the walking distance; and location and distance to emergency supplies or facilities such as fire hose connections, fire extinguishers, defibrillator stands, and eye wash stations. The distance between nodes could, in theory, be calculated as a function of signal strength, but as illustrated in FIG. 22 signal strength does not necessarily correlate with distance. Each node preferably is configured to broadcast its identification and location information to all nodes in the BNES and to provide such information upon request.

Each node unit preferably uses the Building Data Table to store its own building environment data, including sensor readings from the node's sensors and media input data produced by the node's media inputs, including for example still images, video images, and audio files. Each node preferably also uses the Building Data Table to store media input, including still images, video images, and audio files, received from other nodes in the BNES network. To conserve memory space building environment data and/or media input data may be distributed to other nodes or stored by other nodes in a compressed or reduced-size format. In an embodiment a node allocates specific areas of memory to storage of media input data for other nodes and overwrites said specific area when it becomes full via, for example, a FIFO routine.

The exemplary Router Table, the Data Table, and the Building Data Table collectively comprise an embodiment of a building node map, or virtual map, that changes dynamically as building conditions change. Alternative embodiments of a business node map may also include information in the Node Log. In alternative embodiments, the data and information stored in the exemplary Router Table, the Data Table, and the Building Data Table could be organized and configured in a distributed database or in other data structures, including one or more graph data structures, in one embodiment of which graph nodes would correspond to each node of the BNES.

FIG. 15 illustrates an exemplary method 1500 for performing function 1204 of software program 1200 (FIG. 12). A node can use method 1500 to identify all other nodes in the BNES and build a Router Table. In 1510, a node issues a beacon call and waits for other nodes to respond. BNES nodes preferably are configured to announce their MAC address in response to a Node's beacon call. In 1520 the node receives responses. Network security is maintained preferably though BNES private network protocols. Exemplary BNES private network protocols in an embodiment alterations made to conventional 802.11 packet header declarations, modulation of the Internet Header Length, and encryption. The node may receive responses from one or more BNES nodes, which preferably will respond using the BNES private network protocols. The node may also receive a conventional response from another 802.11 device that is not a BNES node; the node will store the MAC address of the 802.11 device and subsequently ignore it. In 1530, the node will determine whether the responding BNES node is already identified in the Router Table, and if it is the node will not seek further information (1540). If the BNES node is previously unknown, the nodes will establish a secure connection under a BNES private network protocol (1550) and collect information from each other (1560) and store the information in its Router Table. MAC Addresses of every node unit that will directly connect with a node unit are collected to populate a Router Table. Level 1 contacts are direct links. Each node unit communicates to the other node units its signal levels SS1 and SS2, which are stored in the Router Table. Each node will also identify to the other node the MAC address for each of its direct connect node units (DCNs), which are entered in the DCMAC field of the Router Table. After repetitive passes the Router Tables will be stable and populated with MAC addresses for all direct connect nodes of the node (1580, 1590).

In step 1590, the node identifies all JC (jump connect) nodes. In an embodiment, the node first identifies a set of JC nodes by identifying one or more DCMAC nodes that are not DC nodes. For each DCMAC node that is not a DC node, the node preferably will identify one or more DC nodes that directly connect to the DCMAC node and select one as a bridge node, preferably the bridge node with the strongest signal strength for the indirect connection between the node and the DCMAC node. The node can then request that the bridge node transmit the data it has about the DCMAC node, including the Router Table and Data Table of the DCMAC node. In an embodiment, the SS1 and SS2 levels for the connection between the bridge node and the DCMAC node are stored in the Router Table entry for the JC node. This process preferably is repeated for each DCMAC node initially identified by the node. Preferably the process is again repeated for every newly-identified node that is included in the DCMAC field for a JC node until the node has populated the Router Table for every node in the BNES. In an embodiment, the DC entry for a JC node may include the MAC address for a bridge node that is a DC to the JC node, and the node can reconstruct the path between the node and the JC node by working backwards from that data. In an alternative embodiment, the node can store in the Router Table (for example, in the DC field) a pointer to a data structure containing the path between the node and the JC node.

FIG. 16 illustrates an exemplary method 1600 for performing function 1206 of software program 1200 (FIG. 12). A node can use method 1600 to for confirm the presence, connections, and signal strength for each BNES node in the Router Table. It does not discover nodes but only confirms presence and verifies the links and signal strength for each node in the Router Table. Method 1600 will be performed for each BNES node in the Router Table. In step 1610 the node will collect the Router Table data for the node, and in step 1620 the node will confirm the SSL levels, DC connections, and JC connections for that node. If the connection is indirect the node will use bridge nodes to obtain the SSL levels and DC and JC connections. A substantial change in the signal levels or a change in DC or JC connections may be indicate possible problems in the network as a whole and preferably is reported to the Awareness System as an error.

Function 1208 of software program 1200 (FIG. 12) includes providing a Public Network Connection (Access Point) for communication with external authorized Mobile users via, for example, conventional 802.11 devices or one or more interface terminals. A limited number of extra-network radio contacts are required to provide Authorized Users with a hosted interactive web page and/or a WAN access link for internet working.

Figure 17:
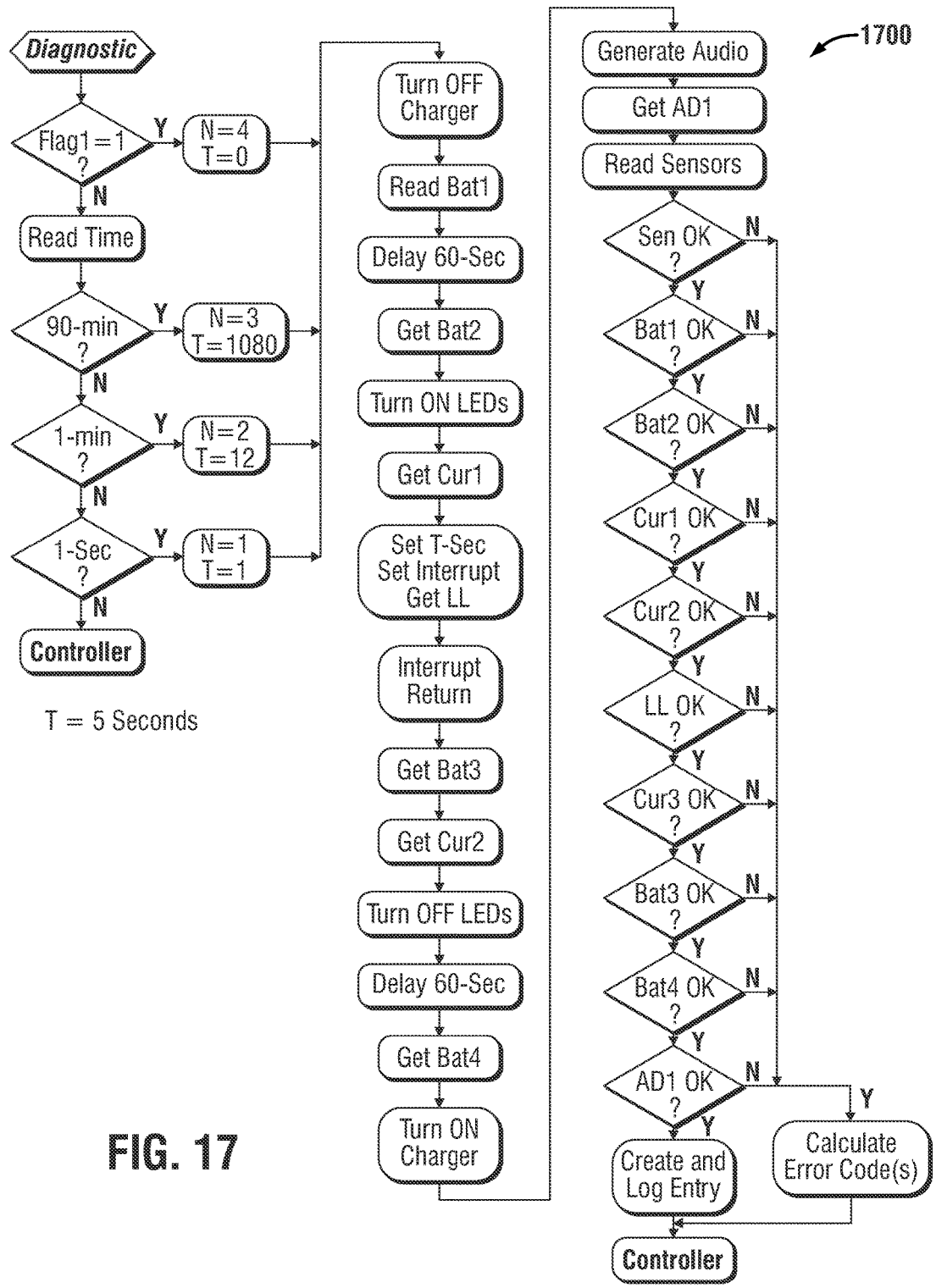
FIG. 17 illustrates elements of an exemplary diagnostic method for use in an exemplary building network emergency system.

FIG. 17 illustrates an exemplary method 1700 for performing function 1210 of software program 1200 (FIG. 12). A node preferably uses method 1700 to perform diagnostic self-tests of a node unit at regular intervals. Each type of test preferably is conducted for a different length of time to comply with regulatory directives.

FIG. 18 illustrates an exemplary method 1800 for performing function 1212 of software program 1200 (FIG. 12) to responding to incoming events or status changes creating error codes upon which the controller will execute the desired response. It will read all the internal sensors including power related data, and compare these readings with reference levels stored in the PFile. In an embodiment, each reading sensor will be read at a configurable (in the PFile) regular interval, for example, 1 hour, and some sensors may be further equipped to generate an interrupt when the sensor reading exceeds a configurable (in the PFile) change threshold. Further, a node preferably will broadcast a collective update directive at regular intervals, at which point each BNES node will read all local sensors and broadcast the readings. In an embodiment a node can evaluate sensor data or building data from another node to identify error, alert or alarm conditions. The node will also be sensitive to alerts generated by other program routines and trigger appropriate responses, including error messages, alert messages, one or more alarm modalities, or both. Errors preferably have an identified code number within a certain range (e.g., from 1 to 255). The Error Code is either generated in a routine and sent to the Awareness System or identified in the Awareness System and thus labeled. FIG. 19 depicts an exemplary error code 1900. Alerts and alarms may be similarly encoded.

Figure 20:
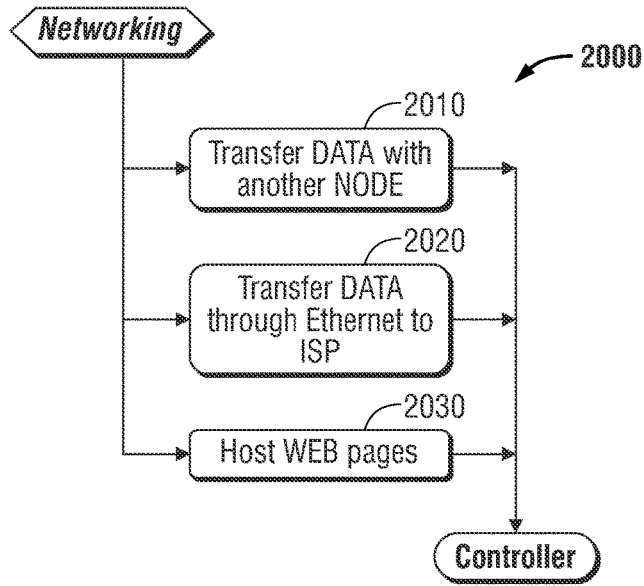
FIG. 20 illustrates elements of an exemplary method of networking in an exemplary building network emergency system.

FIG. 20 illustrates an exemplary method 2000 for performing function 1214 of software program 1200 (FIG. 12). A node preferably can use method 2000 for sharing data and information between BNES node units in an IEEE 803.11 based ad-hoc network of individual access points the operate as a private secured network. Each node unit radio system may operate as a beacon, access point, and router to facilitate the communications process, and may further operate as a web hosting server. There are three basic functions for the networking process. Shown at step 2010, data, information and files preferably may be transferred between and among node units inside a private network. Node units preferably will archive data and information, including media input files (such as video images or audio images) on other node units to be available in the case the node unit is lost or becomes inoperative. In an embodiment, each BNES node is programmed to transmit to another node, or broadcast to all nodes or all DC nodes, and to receive from another node, local sensor readings, Node Log entries, Router Table entries, Data Table entries, and other information stored in Building Data file, and updates to local sensor readings, Node Log entries, Router Table entries, Data Table entries, and other information stored in Building Data file. Each BNES node unit is configured to stream local media input data, for example, video data from a local camera or audio data from a local microphone, to another node, or between two other nodes. When a node learns of a new node in the BNES, preferably the node will exchange with the new Node Router Table entries, Data Table entries, location information and other data stored in the Building Data file, and Node Log entries. In an embodiment a node will poll its DC nodes at configurable (in the PFile) regular intervals to retrieve sensor readings from the nodes, or a local sensor will report a changed sensor reading; and the node will preferably report the updated sensor readings to all its DC nodes, or alternatively to all nodes. In an embodiment a node will transmit updates to media input files, for example, new camera images or new audio files, upon request, or at regular intervals, or when an error, alert, or alarm condition is recognized.

Shown at step 2020, data may be transferred by way of a secure landline Ethernet connection to an ISP or other connection to a public data network such as the Internet. The BSEN preferably is attached to the outside world through either hardwire or fiber to an ISP directly or through a local WLAN or LAN with Internet access. To facilitate the radio connection of the node unit Private Network to the WAN/WLAN/LAN/ISP, the network system preferably provides a hardware unit that is a node unit radio system with a firewall and Network Interface to a landline connection. This unit will register as a node unit in the Private Network and an interface to the ISP. This channel may be accessed to collect data to store on the cloud, pass messages such as instant messages (IMs) and emails for notifications, alerts, and software updating, maintained and all other operations performed with or on the network and node units. Shown at step 2030, a limited number of secured local public network connections may be formed. Individual node units may direct radio connections to interactive terminals through an interactive HTML page portal. This portal will offer authorization and system protection and guide a user to a limited number of activities including seeing through a node unit's camera on a mobile device screen, listening through a node's microphone on a mobile device's speaker or earphones, delivering audio to a node unit's loudspeaker from a mobile device phone microphone, seeing the sensor data in a human format, and changing recorded messages using the mobile device microphone.

Embodiments of the BNES network employ two Wi-Fi ecosystems, a private network and a public network. The private network may be configured as the primary radio system and is constantly passing data between the nodes as nodes back up each other's data. At any time, the building management or emergency services may input or output data that will be stored or retrieved in each node independently as it operates as part of a redundant shared memory for the entire network system. Direct access to the system network may be restricted to direct radio contact with nodes registered with the system at the physical site. In certain embodiments, the MPU of a BNES node unit is programmed to use an altered packet header coding, encryption, and/or message authentication coding to prevent interception, eavesdropping, or interference by non-BNES Wi-Fi radio devices. The public network may function as Wi-Fi Hotspots for public use, that is, offering Internet access over the wireless local area network made of similar nodes acting as routers connected to one or more link(s) to an Internet Service Provider. Without external ISP connection the system will be a bounded public network. External ISP linkage can be either through a local wired attachment or authorized wireless connection.

Figure 10:
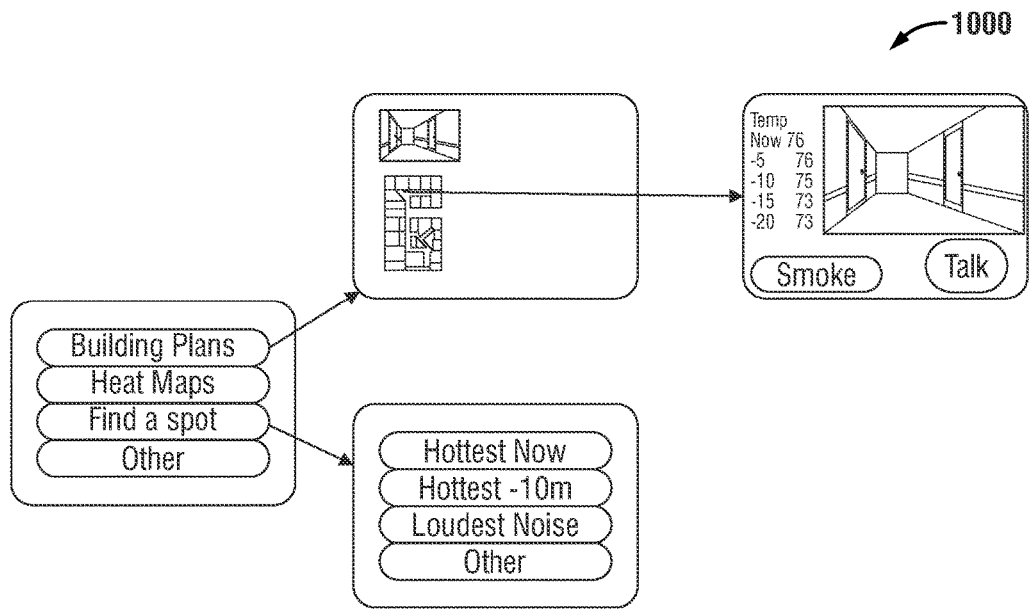
FIGS. 10 and 11 illustrate exemplary web browser pages in embodiments of interaction modalities.
Figure 11:
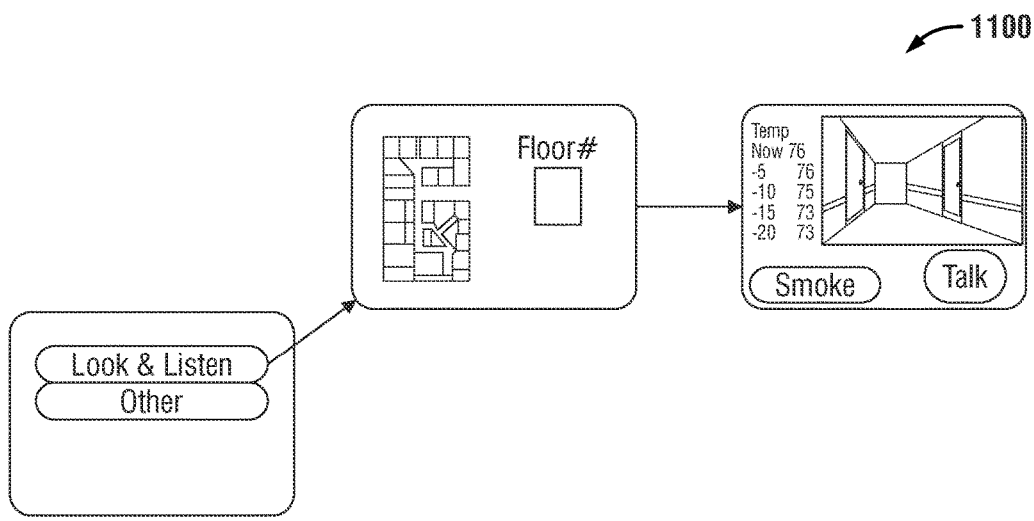

Certain individuals may require access to the network system. These include first responders or others actively engaging in emergency events in the facility, building security personnel, and management and administrative personnel for both the updating and addition of data to the system. Public accessibility to the network may be determined by owners and managers of the building in which the network resides. For example, the management may decide to not make the network available to the public, however it will still exist and register on Wi-Fi devices within range. In such a case when engaged by a browser (e.g., Chrome, FireFox, Safari, Android, NetScape, and Internet Explorer), the open screen will include some form of a request for authentication such as a password or code. If open to the public the browser screen will offer a choice of access to the Internet, which will go to the authentication page. Upon connecting to the public network through a browser, an initial screen will appear offering the choice of either going on to the public network (if it is offered) or to be tested and switched to read and write to a private network controller screen for access to the private network data. This transfer process is configured in each of the node units and permits an outside-authorized connection to the system. Each authorized user class may have a different set of browser-based pages available to them, generally illustrated in FIGS. 10 and 11. Using the browser-based interface 1000 in FIG. 10, the authorized user can select drawings, building plans, or documents to view in more detail. One such view might be a view of the location of all nodes, and then a view of that node when it is touched. The authorized user in FIG. 10 can also display a heat map, a 3-D line drawing of all building nodes plotted with temperature for a predetermined interval, for example 30 minutes.

The network may be configured as a closed wireless network, that is, the network operates as a self-powered Wi-Fi Access Point (Hot-Spot) with an attached System Area Network (SAN) and communication shared by all those logged on. When two or more nodes are within wireless range of each other they may automatically configure the SAN to share all storage resources. Within wireless range may mean for example, up to 40 m (120 feet) or more for indoor antennas, or up to 300 feet using outside antennas, or up to 3 km, up to 5 km, up to 7 km, up to 10 km, or more using external directional antennas.

When an authorized user logs into the network the user's location may be registered in the SAN. As the user moves to other locations, the registry is configured to follow the user's location. If the user leaves the network and then returns to the SAN from anywhere their registry, data, and email will follow. For example, network software services may include SAN access for storage such as a browser page that appears as a Window Explorer screen and will function similarly showing the files in the storage system. A 'Z-Drive,' which in an embodiment is the solid-state storage in the unit, may be preloaded with an inventory of building reference data. Users may be able to create their own personal files in a similar manner under their unique user name. Access to the filing system is either directly through the browser or the operating system as seen by an application's access. All nodes and files are shared in the system. Individual user's files may appear on several nodes as their use of the nodes changes (e.g., the user moves from one location to another). The node that the user logs onto must check the SAN for location of all the user's files and on request bring them all to the node currently in use.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

What is claimed is:

1. A node for use in a building network emergency system, comprising:
    a plurality of sensors, the plurality of sensors configured to collect a plurality of types of building environment data;
    an emergency light system, comprising illumination lighting and alert lighting;
    an audio loudspeaker;
    one or more media inputs, wherein one or more media inputs comprise a camera and a positioning system for the camera;
    one or more media outputs;
    a wireless local network transceiver adapted and configured for communicating with one or more other nodes of the building network emergency system;
    a computer operatively coupled to the plurality of sensors, the emergency light system, the audio loudspeaker, the one or more media inputs, the one or more media outputs, and the wireless local network transceiver, the computer comprising a processor operatively coupled to a memory,
    wherein the memory comprises instructions which when performed by the processor cause the node:
        to store building data in the memory as local building data, wherein building data comprises at least one of building environment data collected by the plurality of sensors and media input data acquired by the one or more media inputs;
        to transmit the local building data and local node identification data to at least one neighbor node via the wireless local network transceiver, wherein the neighbor node is one of one or more other nodes of the building network emergency system; and to receive and store in the memory remote building data and node identification data from the neighbor node via the wireless local network transceiver, wherein the remote building data comprises local building data of another node of the building network emergency system,
    wherein the node stores sensor data from every other node in the building network emergency system in a log for a preset period of time, and transmits content of the log to each of its neighbor nodes.

2. The node of claim 1 wherein the memory further comprises instructions which when performed by the processor cause the node to create a building node map comprising node identification data and building data for each neighbor node within range of the wireless local network transceiver.

3. The node of claim 2 wherein the building node map comprises node identification data and building data for at least one node of the building network emergency system that is outside the range of the wireless local network transceiver.

4. The node of claim 3 wherein the memory further comprises instructions which when performed by the processor cause the node to receive and store in the memory remote building data and node identification data from each node comprised in the building node map.

5. The node of claim 4 wherein the memory further comprises instructions which when performed by the processor cause the node to receive and store in memory updated building data from at least one other node.

6. The node of claim 5 wherein the memory further comprises instructions which when performed by the processor cause the node to update the building node map with the updated building data.

7. The node of claim 1 wherein the memory further comprises instructions which when performed by the processor cause the node to trigger an alarm modality based on the value of a building datum.

8. The node of claim 7 wherein the alarm modality comprises the sending of emails, SMS text messages, the activation of the node resident audio enunciators, blinking the nodes lighting, sending machine activations codes via radio to a building resident BACnet protocol, any electronically activated Human Interface Device.

9. The node of claim 1 wherein the memory further comprises instructions which when performed by the processor cause the node to transmit updated local building data to at least one neighbor node after a change in the local building data.

10. The node of claim 1 wherein the node is configured to be operatively coupled to an interface terminal.

11. The node of claim 10 wherein the interface terminal is configured to be operatively coupled to the node via the wireless local network transceiver, another local wireless network, a wired local network, another local network, a public communications network, or a point-to-point connection.

12. The node of claim 10 wherein the node is operatively coupled to the interface terminal via an Ethernet connection.

13. The node of claim 10 wherein the node is operatively coupled to the interface terminal via an internet connection.

14. The node of claim 10 wherein the memory further comprises instructions which when performed by the processor cause the node to provide one or more interface modalities to the interface terminal.

15. The node of claim 14 wherein the one or more interface modalities comprise a first responder interface modality, a security interface modality, a management interface modality, or an administrative interface modality.

16. The node of claim 10 wherein the memory further comprises instructions which when performed by the processor cause the node to transmit to the interface terminal local building data, remote building data, or building reference data stored in the memory.

17. The node of claim 10 wherein the memory further comprises instructions which when performed by the processor cause the node to transmit to the interface terminal the building node map.

18. The node of claim 10 wherein the memory further comprises instructions which when performed by the processor cause the node to receive an audio signal from the interface terminal and broadcast the audio signal via the loudspeaker.

19. The node of claim 1 wherein the one or more emergency response functions comprise controlling the emergency light system and/or an emergency sound system.

20. The node of claim 19 wherein the emergency sound system comprises broadcasting via the audio loudspeaker a radio message, audio media input from another node, or a prerecorded message stored in memory.

21. The node of claim 1 wherein the alert lighting system comprises color LED signage lights.

22. The node of claim 1 wherein the wireless local network transceiver is configured to transmit and receive signals over an IEEE 802.11 network.

23. The node of claim 1 wherein the node communicates with the one or more other nodes of the building network emergency system over a wireless local network.

24. The node of claim 23 in which the wireless local network is an IEEE 802.11 network.

25. The node of claim 23 in which the wireless local network further comprises a private network.

26. The node of claim 25 wherein the node exchanges building data with the one or more other nodes of the building network emergency system over the private network.

27. The node of claim 26 wherein the memory further comprises instructions which when performed by the processor cause the node to use encryption and or network protocols incompatible with public access for communications over the private network.

28. The node of claim 23 the wireless local network comprises at least one node in a first building and at least one node in a second building, the second building being different from the first building.

29. The node of claim 1 wherein the wireless local network transceiver is operatively coupled to one or more antennas.

30. The node of claim 29 wherein one or more of the antennas are configured to operate as a Wi-Fi Hot Spot.

31. The node of claim 29 wherein one or more of the antennas are configured to have a range greater than 100 meters.

32. The node of claim 1 wherein the plurality of sensors comprise one or more sensors selected from the group consisting of: light level sensor; smoke detector; carbon monoxide sensor; carbon dioxide sensor; nitrogen oxide sensor; hydrocarbon vapor sensor; temperature sensor; infrared level sensor; and motion sensor.

33. The node of claim 1 wherein the plurality of types of building environment data comprise two or more types of building environment data from selected from the group consisting of: ambient visible light; airborne particulate density; carbon monoxide; carbon dioxide; nitrogen oxide; hydrocarbon vapor; relative humidity; ambient temperature; infrared light energy; vibratory audio; acceleration; motion; battery charge; and mains power supply.

34. The node of claim 1 wherein the one or more media inputs comprise a camera, touchscreen, keyboard, keypad, and/or or a microphone.

35. The node of claim 1 wherein the one or more media inputs comprise two or more microphone elements and the node further comprises phase adjustment between the two or more microphone elements to remotely steer the directional sensitivity of the audio sensors.

36. The node of claim 1 wherein the one or more media inputs comprise a camera and the memory further comprises instructions which when performed by the processor cause the node to stream image data from the camera to an interface terminal or to another node.

37. The node of claim 1 wherein the one or more media outputs comprise a display screen.

38. The node of claim 37 wherein the memory further comprises instructions which when performed by the processor cause the node to display on the display screen local building data, remote building data, or building reference data stored in the memory.

39. The node of claim 37 wherein the display screen displays node identification information.

40. The node of claim 37 wherein the memory further comprises instructions which when performed by the processor cause the node to receive and display on the display screen image data streamed from another node.

41. The node of claim 37 wherein the memory further comprises instructions which when performed by the processor cause the node to receive and display on the display screen information or data from an interface terminal.

42. The node of claim 1 further comprising a mount for mounting the node to a building.

43. The node of claim 1 wherein the node is operatively coupled to a primary building alarm system.

44. The node of claim 1 wherein the memory further comprises instructions which when performed by the processor cause the node to perform one or more emergency response functions.

45. The node of claim 1 wherein one or more components are modular.

46. The mode of claim 45 wherein one or more of the sensors are modular.

47. The node of claim 1 further comprising a backup power supply.

* * * * *